US012592200B2

(12) United States Patent　　(10) Patent No.:　US 12,592,200 B2
　　Cho et al.　　　　　　　　　　　(45) Date of Patent:　*Mar. 31, 2026

(54) DISPLAY PANEL AND DISPLAY APPARATUS

(71) Applicant: LG DISPLAY CO., LTD., Seoul (KR)

(72) Inventors: SeongHo Cho, Paju-si (KR); DaeSung Jung, Paju-si (KR); HwanJoo Lee, Paju-si (KR); Haksu Kim, Paju-si (KR)

(73) Assignee: LG Display Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,586

(22) Filed: Oct. 8, 2024

(65) Prior Publication Data

US 2025/0029565 A1　　Jan. 23, 2025

Related U.S. Application Data

(63) Continuation of application No. 18/481,363, filed on Oct. 5, 2023, now Pat. No. 12,159,591.

(30) Foreign Application Priority Data

Oct. 12, 2022　(KR) ........................ 10-2022-0130277

(51) Int. Cl.
　　*G09G 3/3266*　　　(2016.01)
　　*B60K 35/60*　　　(2024.01)
　　　　　　(Continued)

(52) U.S. Cl.
　　CPC ........... *G09G 3/3266* (2013.01); *B60K 35/60* (2024.01); *G09G 3/32* (2013.01); *B60K 35/22* (2024.01);
　　　　　　(Continued)

(58) Field of Classification Search
　　CPC ................... G09G 3/3266; G09G 3/32; G09G 2310/0267; G09G 2320/068;
　　　　　　(Continued)

(56) References Cited

U.S. PATENT DOCUMENTS

| 2006/0114193 A1 | 6/2006 | Kwak |
| 2009/0115705 A1 | 5/2009 | Miller et al. |
| (Continued) | | |

FOREIGN PATENT DOCUMENTS

| CN | 102467878 A | 5/2012 |
| CN | 214587961 U | 11/2021 |
| (Continued) | | |

OTHER PUBLICATIONS

Office Action in Taiwanese Appln. No. 112138610, mailed on Oct. 17, 2024, 12 pages (with machine translation).

(Continued)

*Primary Examiner* — Premal R Patel

(74) *Attorney, Agent, or Firm* — Fish & Richardson P.C.

(57)　　ABSTRACT

A display apparatus includes a mode controller configured to generate a first control signal and a second control signal by using a gate-off voltage and a gate-on voltage; a gate driving circuit configured to generate an emission signal; a first pixel circuit including a driving transistor, a first transistor receiving the first control signal, a second transistor receiving the second control signal, a third transistor receiving the emission signal, a first light emitting element connected to the first transistor, and a second light emitting element connected to the second transistor; a first lens disposed on the first light emitting element; and a second lens disposed on the second light emitting element.

26 Claims, 16 Drawing Sheets

600

(51) Int. Cl.
    *G09G 3/32*         (2016.01)
    *B60K 35/22*      (2024.01)

(52) U.S. Cl.
    CPC .............. *G09G 2310/0267* (2013.01); *G09G 2320/068* (2013.01); *G09G 2354/00* (2013.01); *G09G 2380/10* (2013.01)

(58) Field of Classification Search
    CPC .......... G09G 2354/00; G09G 2380/10; G09G 2300/0426; G09G 2300/0842; G09G 2300/0861; G09G 2310/0286; G09G 3/3233; G09G 2320/028; G09G 2358/00; G09G 3/3208; G09G 3/38; B60K 35/60; B60K 35/22; B60K 2360/1523; B60K 37/00; H10K 50/858
    See application file for complete search history.

(56)         References Cited

U.S. PATENT DOCUMENTS

| | | | |
|---|---|---|---|
| 2011/0284881 A1 | 11/2011 | Shikina | |
| 2012/0127064 A1* | 5/2012 | Kawano | G09G 3/3225 |
| | | | 345/76 |
| 2015/0022508 A1 | 1/2015 | Kim | |
| 2015/0279272 A1 | 10/2015 | Takahara | |
| 2020/0150806 A1* | 5/2020 | Kim | H10H 20/854 |
| 2020/0258451 A1 | 8/2020 | Takahara et al. | |
| 2021/0049958 A1 | 2/2021 | Kim et al. | |
| 2021/0223583 A1 | 7/2021 | Heber et al. | |
| 2022/0158135 A1 | 5/2022 | Irobe | |

FOREIGN PATENT DOCUMENTS

| | | |
|---|---|---|
| CN | 114639794 A | 6/2022 |
| JP | 2022-080507 A | 5/2022 |
| KR | 20210073129 A | 6/2021 |
| TW | I776720 B | 9/2022 |
| WO | 2011/145174 A1 | 11/2011 |

OTHER PUBLICATIONS

Japanese Office Action dated Sep. 24, 2024 issued in Patent Application No. 2023-177058 (4 pages).
European Extended Search Report dated Jan. 30, 2024, issued in Patent Application No. 23202985.0 (14 pages).
Office Action in Japanese Appln. No. 2023-177058, mailed on Apr. 24, 2025, 8 pages (with English translation).
Office Action in Indian Appln. No. 202314068538, mailed on Jan. 6, 2026, 9 pages (with English translation).

* cited by examiner

DISPLAY PANEL AND DISPLAY APPARATUS

CROSS-REFERENCE TO RELATED APPLICATIONS

This application is a continuation of U.S. patent application Ser. No. 18/481,363, filed on Oct. 5, 2023, which claims the priority of Korean Patent Application No. 10-2022-0130277 filed on Oct. 12, 2022, which are hereby incorporated by reference in their entirety.

BACKGROUND

Field of the Disclosure

The present disclosure relates to a display panel and a display apparatus.

Description of the Background

As the technology of modern society has been developed, the display apparatus is used in various ways to provide information to a user. The display apparatus is also included in various electronic devices requiring a higher technology for confirming an input of a user and providing information in response to the confirmed input, including an electronic display panel for transmitting visual information in one direction.

For example, the display apparatus may be included in a vehicle to provide various information to a driver and a passenger of the vehicle. However, the display apparatus of the vehicle needs to properly display content so as not to disturb driving of the vehicle. For example, the display apparatus needs to limit the display of content that may distract concentration on driving during driving of the vehicle.

SUMMARY

Accordingly, the present disclosure is directed to a display panel and a display apparatus that substantially obviate one or more of the problems due to limitations and disadvantages described above.

More specifically, the present disclosure is to provide a display apparatus and a display panel capable of efficiently controlling a pixel circuit including a plurality of light emitting elements by using a mode controller.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display apparatus includes a mode controller configured to generate a first control signal and a second control signal by using a gate-off voltage and a gate-on voltage, a gate driving circuit configured to generate an emission signal, a first pixel circuit including a driving transistor, a first transistor arranged to receive the first control signal, a second transistor arranged to receive the second control signal, a third transistor arranged to receive the emission signal, a first light emitting element connected to the first transistor, and a second light emitting element connected to the second transistor, a first lens disposed on the first light emitting element, and a second lens disposed on the second light emitting element.

In another aspect of the present disclosure, a display panel includes a mode controller configured to generate a first control signal and a second control signal in accordance with a gate-off voltage and a gate-on voltage; a gate driving circuit configured to generate an emission signal; a first display region controlled by the mode controller and including at least one first pixel circuit and configured to provide a first viewing angle; a second display region controlled by the mode controller and including at least one second pixel circuit and configured to provide a second viewing angle, the first viewing angle being greater than the second viewing angle, wherein the mode controller provides the first control signal with the first display region and the second control signal with the second display region.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
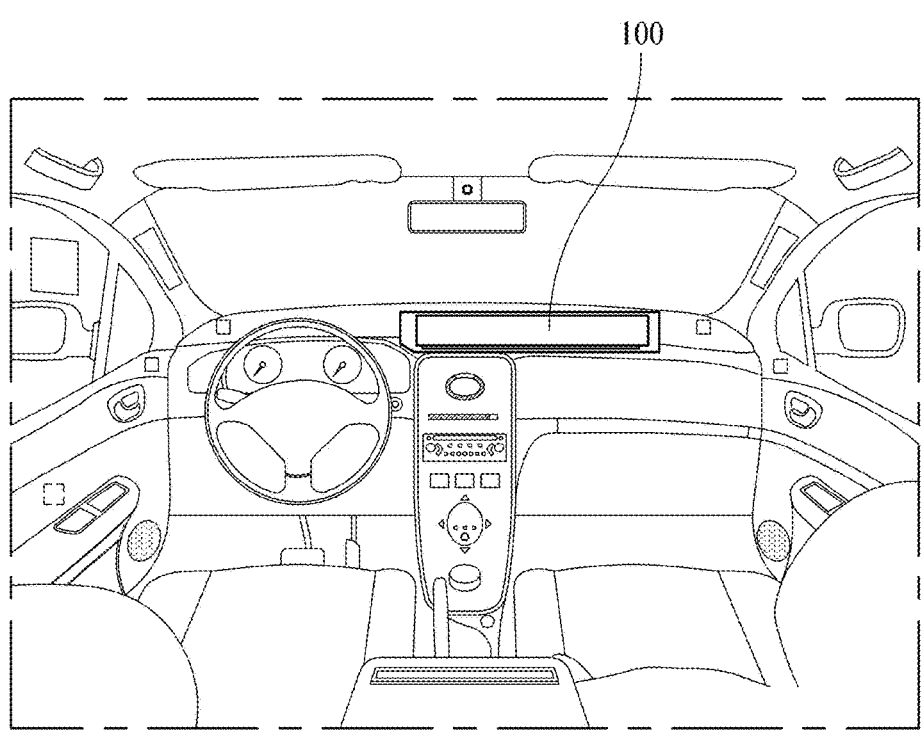
FIG. 1 is an example of a display apparatus according to one aspect of the present disclosure.

The term used in aspects has been selected from general terms currently widely used with consideration for functionality in this disclosure, but it may vary depending on the intent or promotion of those skilled in the art, the appearance of new technology, etc. If needed, the applicant may arbitrarily select the specific term. In this case, the meaning of the term will be described in detail in the corresponding description. Therefore, the term used in the present disclosure should be defined based on the meaning of the term and the contents throughout the disclosure, instead of the simple name of term.

When a certain part of the entire disclosure includes a certain element, this means not to exclude other components unless otherwise stated, but may further include other components.

The expression "at least one of A, B, and C" described throughout the disclosure may encompass "A alone", "B alone", "C alone", "A and B", "A and C", "B and C", or "all of A, B, and C". The advantages and features of the present disclosure, and methods of achieving them will become apparent with reference to the aspects described in detail below in conjunction with the accompanying drawings.

The shapes, sizes, ratios, angles, and numbers disclosed in the drawings for describing aspects of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted or may be briefly discussed.

In the case in which "comprise," "have", and "include" described in the present specification are used, another part may also be present unless "only" is used. The terms in a singular form may include plural forms unless noted to the contrary. In construing an element, the element is construed as including an error region although there is no explicit description thereof.

In describing a positional relationship, for example, when the positional order is described as "on," "above," "below," "beneath", and "next," etc., the case of no contact therebetween may be included, unless "direct" is used. For example, if it is mentioned that a first element is positioned "on" a second element, it does not mean that the first element is essentially or directly positioned above the second element in a figure.

It will be understood that, although the terms "first," "second," etc. may be used herein to describe various elements, these elements should not be limited by these terms. These terms are only used to distinguish one element from another and cannot define any order or sequence. For example, a first element could be termed a second element, and, similarly, a second element could be termed a first element, without departing from the scope of the present disclosure.

The area, length, or thickness of each element described in the specification is illustrated for convenience of description, and the present disclosure is not necessarily limited to the area and thickness of the illustrated configuration.

Features of various aspects of the present disclosure may be partially or overall coupled to or combined with each other and may be variously inter-operated with each other and driven technically as those skilled in the art may sufficiently understand. The aspects of the present disclosure may be carried out independently from each other or may be carried out together in co-dependent relationship.

The terms which will be described later are selected from generally known and used terms considering their functions in the present disclosure, and may be modified depending on intention of a user or an operator, practices, or the like. Accordingly, the terms used herein should be defined by the description disclosed herein.

A transistor constituting a pixel circuit in the present disclosure cancan include at least one of an oxide thin film transistor (TFT), an amorphous silicon TFT (a-Si TFT), and a low temperature poly silicon (LTPS) TFT.

The following aspects will be described based on an organic light emitting display apparatus. However, the aspects of the present disclosure are not limited to the organic light emitting display apparatus, and may be applied to an inorganic light emitting display apparatus including an inorganic light emitting material. For example, the aspects of the present disclosure may be applied to a quantum dot display apparatus.

It will be understood that the terms such as "first," "second" and "third" are only used to distinguish one element from another element in each aspect, and the aspects are not limited by these terms. Accordingly, the same terminology cancan refer to different elements depending on the aspects.

Hereinafter, aspects of the present disclosure will be described with reference to the drawings.

FIG. 1 is an example of a display apparatus according to one aspect of the present disclosure.

In the aspect, the display apparatus 100 may be disposed in at least a portion of a dashboard of vehicle. The dashboard of vehicle includes a configuration disposed on a front surface of a front seat (e.g., a driver's seat and a passenger seat) of the vehicle. For example, an input configuration for manipulating various functions (e.g., an air conditioner, an audio system, and a navigation system) inside the vehicle may be arranged on the dashboard of vehicle.

In the aspect, the display apparatus 100 may be disposed on the dashboard of vehicle and may operate as an input for manipulating at least a portion of the various functions of vehicle. The display apparatus 100 may provide various information related to the vehicle, for example, driving information of vehicle (for example, a current speed of vehicle, a remaining fuel amount, and a driving distance), and information (for example, damage to a vehicle tire) of vehicle components.

In the aspect, the display apparatus 100 may be arranged to traverse the driver's seat and passenger seat disposed in the front seat of vehicle. Herein, users of the display apparatus 100 may include a driver and a passenger on the passenger seat of the vehicle. Both the driver and the passenger of the vehicle may use the display apparatus 100.

In the aspect, only a part of the display apparatus 100 may be shown in FIG. 1. The display apparatus 100 shown in FIG. 1 may represent a display panel among various configurations included in the display apparatus 100. For example, the display apparatus 100 shown in FIG. 1 may represent at least a portion of a display area and a non-display area of the display panel. The configuration other than the part illustrated in FIG. 1 in the configuration of the display apparatus 100 may be mounted inside the vehicle (or at least a portion of vehicle).

Figure 2:
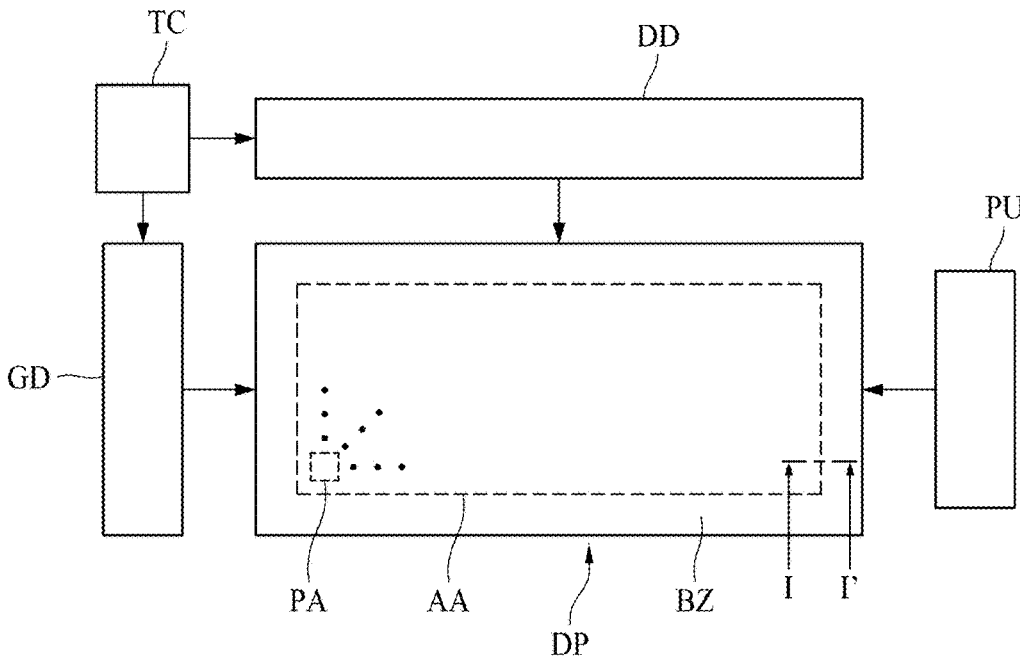
FIG. 2 is a functional block diagram of the display apparatus according to one aspect of the present disclosure.

FIG. 2 is a functional block diagram of the display apparatus according to one aspect of the present disclosure.

The display apparatus according to one aspect of the present disclosure may be applied with an electroluminescent display apparatus. The electroluminescent display apparatus may be an organic light emitting diode display apparatus, a quantum dot light emitting diode display apparatus, or an inorganic light emitting diode display apparatus.

Referring to FIG. 2, the display apparatus may include a display panel DP, a data driver DD, a gate driver GD, a timing controller TC, and a power unit PU.

In the aspect, the display panel DP may generate an image to be provided to a user. For example, the display panel DP may generate and display an image to be provided to a user through a pixel area PA in which a pixel circuit is disposed.

The data driver DD, the gate driver GD, the timing controller TC, and the power unit PU may provide a signal for an operation of each pixel area PA through signal lines. For example, the signal lines may include data lines DL, gate lines GL, and power voltage supply lines PL shown in FIG. 3.

Figure 3:
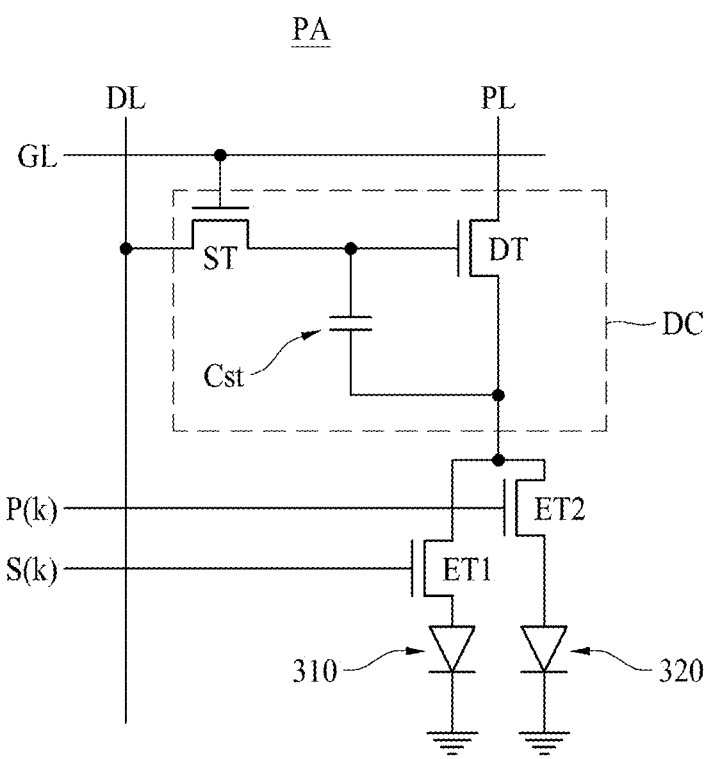
FIG. 3 illustrates an example of a pixel circuit of the display apparatus according to one aspect of the present disclosure.

For example, the data driver DD applies a data signal to each pixel area PA through the data lines DL of FIG. 3, the gate driver GD applies a gate signal to each pixel area PA through the gate lines GL, and the power unit PU may supply a power voltage to each pixel area PA through the power voltage supply lines PL.

The timing controller TC may control the data driver DD and the gate driver GD. For example, the timing controller TC may realign digital video data input from the outside according to a resolution of the display panel DP and may supply the realigned digital video data to the data driver DD.

The data driver DD converts digital video data input from the timing controller TC into an analog data voltage based on a data control signal and supplies the analog data voltage to the plurality of data lines.

The gate driver GD may generate a scan signal and an emission signal (or emission control signal) based on a gate control signal. The gate driver GD may include a scan driver and an emission signal driver. The scan driver may generate the scan signal in a row sequential manner, which is following the sequence of rows, one after another, to drive at least one scan line connected to each pixel row and may supply the scan signal to the scan lines. The emission signal driver may generate the emission signal in a row sequential manner to drive at least one emission signal line connected to each pixel row and may supply the emission signal to the emission signal lines.

According to one aspect, the gate driver GD may be disposed on the display panel DP in a gate-driver in panel (GIP) manner. For example, the plurality of gate drivers GD may be divided into two parts and arranged on at least two sides of the display panel DP, respectively.

The display area AA of the display panel DP may include the plurality of pixel areas (or pixels, or pixel circuits) PA. In the pixel area PA, the plurality of data lines (e.g., the data lines DL of FIG. 3) and the plurality of gate lines (e.g., the gate lines GL of FIG. 3) may intersect each other, and subpixels may be included at each of intersections. Each of the subpixels included in one pixel area PA may emit different colors. For example, the pixel area PA may implement blue, red, and green colors using the three subpixels. However, the present disclosure is not limited thereto, and the pixel area PA may further include a subpixel for implementing a specific color (e.g., white color).

In the pixel area PA, an area for implementing blue color is referred to as a blue subpixel area, an area for implementing red color is referred to as a red subpixel area, and an area for implementing green color is referred to as a green subpixel area.

In the aspect, the pixel area PA may include the plurality of subpixels. Each of the plurality of subpixels may be divided into a first lens area and a second lens area for providing different viewing angles. For example, the pixel area PA may include the first lens area for forming a first viewing angle by providing light to a first range of viewing angles, and the second lens area for forming a second viewing angle by provides light to a second range. The first range may correspond to a range wider than the second range of viewing angles.

The non-display area BZ may be disposed along the circumference of the display area AA. Various components for driving the pixel circuit disposed in the pixel area PA may be disposed in the non-display area BZ. For example, at least a portion of the gate driver GD may be disposed in the non-display area BZ. The non-display area BZ may be referred to as a bezel area.

FIG. 3 illustrates an example of the pixel circuit of the display apparatus according to one aspect of the present disclosure. The pixel area PA may include the plurality of subpixels for representing different colors and the pixel circuit corresponding to each of the plurality of subpixels. FIG. 3 illustrates an example of the pixel circuit for one subpixel disposed in the pixel area PA.

Referring to FIG. 3, the pixel circuit may include a plurality of transistors DT, ST, ET1, and ET2, a capacitor Cst, and a plurality of light emitting elements 310 and 320.

A driving transistor DT and the capacitor Cst may be connected to the switching transistor ST. A first electrode of the driving transistor DT may be connected to the power voltage supply line PL.

The switching transistor ST may be connected to the gate line GL and may be supplied with the gate signal. The switching transistor ST may be turned-on or turned-off by the gate signal. A first electrode of the switching transistor ST may be connected to the data line DL. A second electrode of the switching transistor ST may be connected to the gate electrode of the driving transistor DT. In this case, when the switching transistor ST is turned-on, the data signal may be supplied to the gate electrode of the driving transistor DT through the switching transistor ST.

The capacitor Cst may be disposed between the second electrode and the gate electrode of the driving transistor DT. The capacitor Cst may maintain the signal, for example, the data signal applied to the gate electrode of the driving transistor DT during one frame.

According to the aspect, the driving transistor DT, the switching transistor ST, and the capacitor Cst are components for driving the light emitting element (e.g., first light emitting element 310 and second light emitting element 320), and may be referred to as a driving portion DC. However, the terms are not limited to these terms.

The first light emitting element 310 may be connected to the first transistor ET1 turned-on or turned-off by a first control signal S(k). The second light emitting element 320 may be connected to the second transistor ET2 turned-on or turned-off by a second control signal P(k).

In this case, the first light emitting element 310 or the second light emitting element 320 may be connected to other components of the pixel circuit, for example, the driving transistor DT according to a mode of operation. The mode may be determined when a predetermined condition is satisfied, or a predetermined condition is satisfied by a user input. For example, when a predetermined first condition is satisfied, the first light emitting element 310 may emit light based on the supply of the first control signal S(k). When a predetermined second condition is satisfied, the second light emitting element 320 may emit light based on the supply of the second control signal P(k). The first condition may include a predetermined condition for driving according to the first mode. The second condition may include a predetermined condition for driving according to the second mode.

The plurality of transistors DT, ST, ET1, and ET2 of FIG. 3 may include at least one of amorphous silicon, polycrystalline silicon, and oxide semiconductor such as Indium Gallium Zinc Oxide (IGZO). The first electrode or second electrode of the transistor may be a source electrode or drain electrode. For example, the first electrode may be the source electrode and the second electrode may be the drain electrode. For another example, the first electrode may be the drain electrode and the second electrode may be the source electrode.

Figure 4:
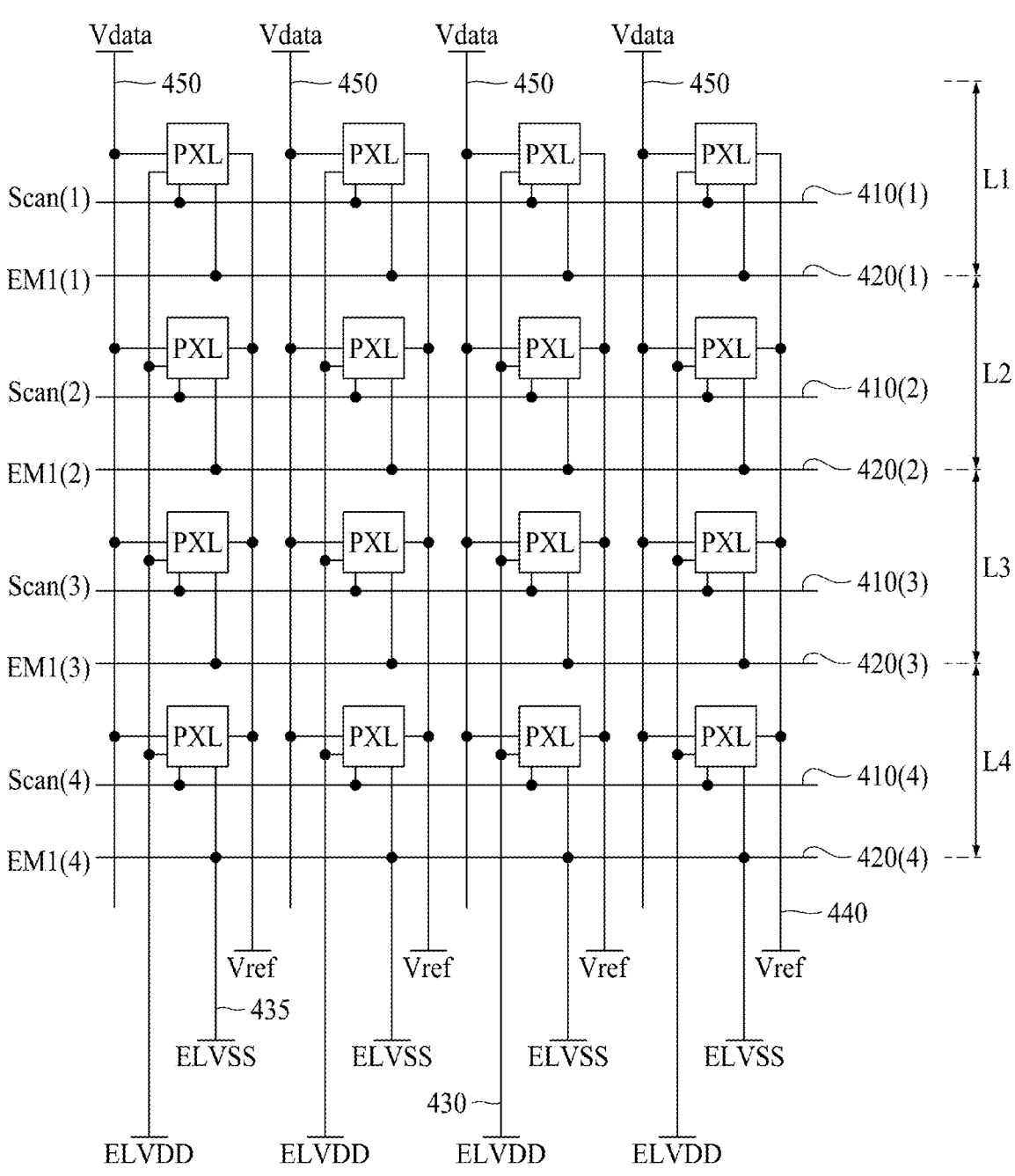
FIG. 4 illustrates an example of a pixel array of the display apparatus according to one aspect of the present disclosure.

FIG. 4 illustrates an example of a pixel array of the display apparatus according to one aspect of the present disclosure. FIG. 4 illustrates an example in which the gate driving circuit and the pixel circuit are connected.

Referring to FIG. 4, a plurality of horizontal pixel lines L1, L2, L3, and L4 may be provided in the pixel array of the display panel (e.g., the display panel DP of FIG. 2). In each of the plurality of horizontal pixel lines L1, L2, L3, and L4, a plurality of pixels PXL may be horizontally adjacent to each other and may be commonly connected to the gate lines (e.g., scan line 410 and first emission signal line 420). Herein, the pixel PXL may include the subpixel of FIG. 2.

In this case, each of the horizontal pixel lines L1, L2, L3, and L4 may represent the plurality of pixels PXL arranged on one line implemented by the horizontally adjacent pixels PXL. The pixel array may include a first power line 430 for supplying a high-potential power voltage ELVDD to the pixel PXL, and a second power line 440 for supplying a reference voltage Vref to the pixel PXL. In addition, the pixels PXL may be connected to a third power line 435 for supplying a low-potential power voltage ELVSS to the pixel PXL.

In the aspect, the gate line may include the scan line 410 supplied with the scan signal SCAN, and the emission signal line 420 supplied with the emission signal EM1. For example, any one of the horizontal pixel lines Ln (n=1~4) may include one scan line 410 (n) and one emission signal line 420 (n).

The pixel PXL may emit at least one color. For example, the pixel PXL may emit any one of red, green, blue, and white colors. The pixel PXL may constitute one unit pixel, and the color implemented in the unit pixel may be determined according to an emission ratio of red, green, blue, and white colors. The scan line 410, the emission signal line 420, the first power line 430, the second power line 440, and the data line 450 may be connected to each pixel PXL.

Figure 5:
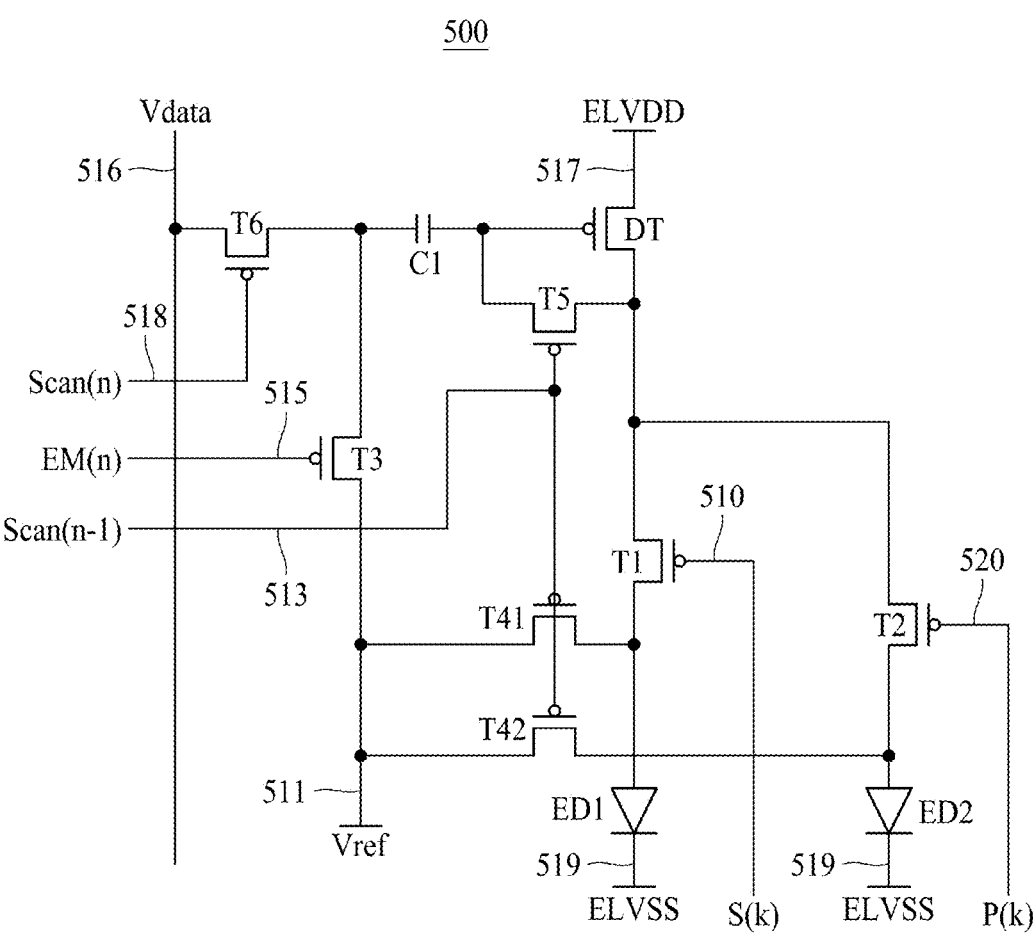
FIGS. 5 and 6 illustrate an example of the pixel circuit of the display apparatus according to the aspect of the present disclosure.
Figure 6:
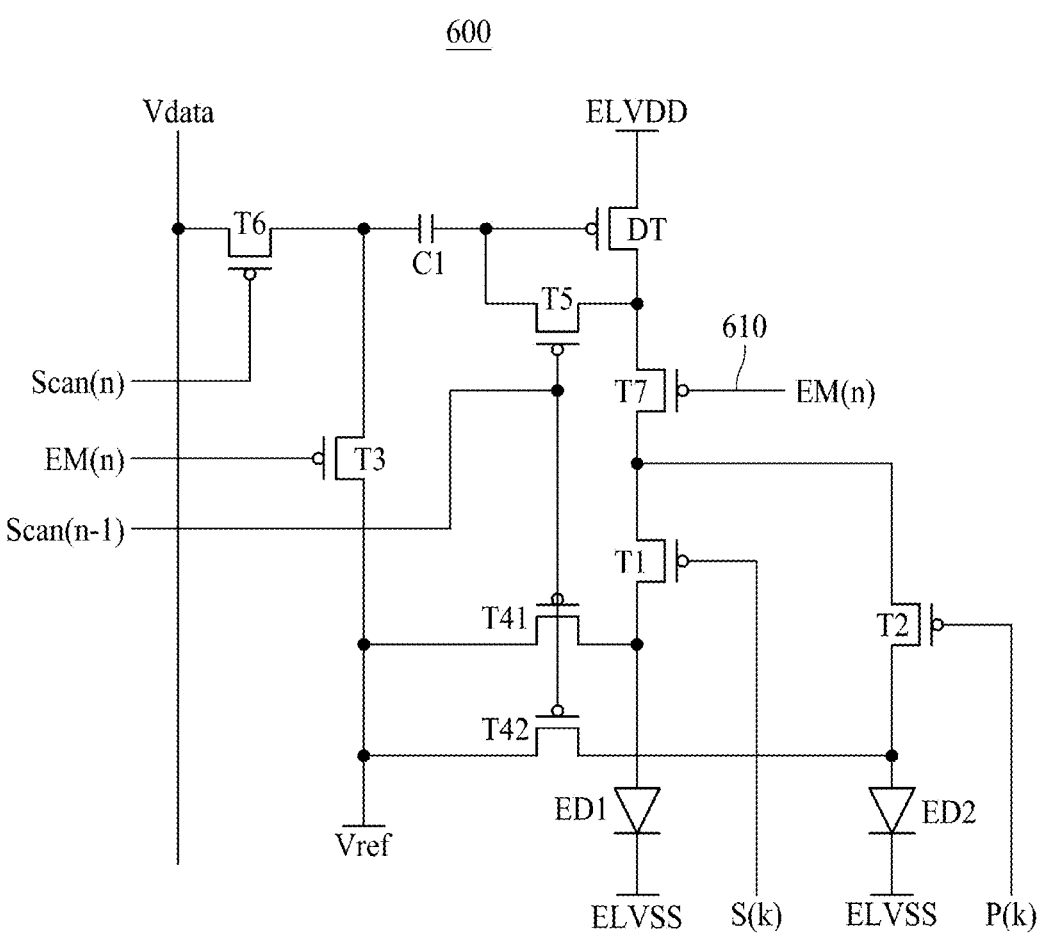

FIGS. 5 and 6 illustrate an example of the pixel circuit of the display apparatus according to the aspect of the present disclosure. FIGS. 5 and 6 illustrate an example of the pixel circuit of the unit pixel PXL included in the pixel array.

Referring to FIG. 5, the pixel circuit 500 may include eight transistors and one capacitor. At least some of the eight transistors included in the pixel circuit 500 may be n-type transistors or p-type transistors. In the case of p-type transistor, a low-level voltage of each driving signal may indicate a voltage for turning on the TFTs, and a high level voltage of each driving signal may indicate a voltage for turning off the TFTs.

Herein, the low-level voltage may correspond to a predetermined voltage lower than the high-level voltage. For example, the low-level voltage may include a voltage within a range of −8 V to −12 V, and the high-level voltage may correspond to a predetermined voltage higher than the low-level voltage. For example, the high-level voltage may include a voltage within a range of 6 V to 8 V. According to the aspect, the low-level voltage may be referred to as a first voltage, and the high-level voltage may be referred to as a second voltage. In this case, the first voltage may be a value lower than the second voltage.

A first electrode or a second electrode of the transistor to be described below may refer to a source electrode or a drain electrode. However, the terms "first electrode" and "second electrode" are used to distinguish each electrode, and do not limit the respective electrodes. In addition, the first electrode may not refer to the same electrode for each electrode. For example, a first electrode of the first transistor T1 may refer to a source electrode of the first transistor T1, and a first electrode of the sixth transistor T6 may refer to a drain electrode of the sixth transistor T6.

In the aspect, the driving transistor DT may be connected to the first transistor T1 connected to the first light emitting element ED1 and the second transistor T2 connected to the second light emitting element ED2. For example, the second electrode of the driving transistor DT may be connected to the first transistor T1 and the second transistor T2.

According to the aspect of the present disclosure, the driving transistor DT may be connected to a first power line 517 for providing a high-potential power voltage ELVDD. For example, the first electrode of the driving transistor DT may be connected to the first power line 517. When the driving transistor DT is turned-on, the high-potential power voltage ELVDD supplied through the first power line 517 may be transferred from the first electrode of the driving transistor DT to the second electrode of the driving transistor DT.

In the aspect, the first transistor T1 may be connected to at least one of the first light emitting element ED1, the second transistor T2, the (4-1)th transistor T41, the fifth transistor T5, and the driving transistor DT.

According to one aspect, a first electrode of the first transistor T1 may be connected to at least one of the driving transistor DT, the second transistor T2, and the fifth transistor T5. A second electrode of the first transistor T1 may be connected to at least one of the (4-1)th transistor T41 and the first light emitting element ED1. The gate electrode of the first transistor T1 may be connected to the first control line 510. The first transistor T1 may be turned-on or turned-off by the first control signal S(k) provided through the first control line 510. When the first transistor T1 is turned-on, the voltage through the driving transistor DT may be input to the first light emitting element ED1 (e.g., anode electrode of the first light emitting element ED1).

Herein, the first control signal S(k) may include the (k)th first control signal supplied to the (k)th column when the pixel circuit 500 is arranged in the (k)th column ('k' is a positive integer). The first control signal S(k) is provided by a mode controller, wherein the first control signal S(k) may control the driving (or light emission) of the first light emitting element ED1 on which a first lens is disposed.

In the aspect, the second transistor T2 may be connected to at least one of the second light emitting element ED2, the first transistor T1, the fifth transistor T5, the (4-2)th transistor T42, and the driving transistor DT.

According to one aspect, a first electrode of the second transistor T2 may be connected to at least one of the driving transistor DT, the first transistor T1, and the fifth transistor T5. A second electrode of the second transistor T2 may be connected to at least one of the second light emitting element ED2 and the (4-2)th transistor T42. The gate electrode of the second transistor T2 may be connected to a second control line 520. The second transistor T2 may be turned-on or turned-off by the second control signal P(k) provided through the second control line 520. When the second transistor T2 is turned-on, the voltage provided through the driving transistor DT may be input to the second light emitting element ED2 (e.g., anode electrode of the second light emitting element ED2.

In the aspect, each of the first light emitting element ED1 and the second light emitting element ED2 may include a light emitting diode. For example, each of the first light emitting element ED1 and the second light emitting element ED2 may be configured as an organic light emitting diode.

Herein, the second control signal P(k) may include the (k)th second control signal supplied to the (k)th column when the pixel circuit 500 is arranged in the (k)th column. The second control signal P(k) may be provided by the mode controller and may be configured to control the driving (or light emission) of the second light emitting element ED2 on which a second lens is disposed.

In the aspect, the first lens may be disposed on the first light emitting element ED1. A viewing angle of an area in which the first light emitting element ED1 is disposed may correspond to a first value by the first lens. For example, the viewing angle of the area in which the first light emitting element ED1 is disposed may be equal to or greater than the first value. The second lens may be disposed on the second light emitting element ED2. A viewing angle of an area in which the second light emitting element EDD2 is disposed may correspond to a second value by the second lens. The second value may be less than the first value. For example, the viewing angle of the area in which the second light emitting element ED2 is disposed may be equal to or less than the second value.

According to one aspect, on the assumption that the pixel circuit 500 is disposed adjacent to the passenger seat, the area in which the first light emitting element ED1 of the pixel circuit 500 is disposed may have the viewing angle of the first value to provide light to a range corresponding to the driver's seat and the passenger seat. The area in which the second light emitting element ED2 is disposed may have the viewing angle of the second value for providing light to a range corresponding to the passenger seat.

In one aspect, the third transistor T3 may be connected to at least one of the (4-1)th transistor T41, the (4-2)th transistor T42, the sixth transistor T6, and the capacitor C1. For example, a first electrode of the third transistor T3 may be connected to the sixth transistor T6 and the capacitor C1. A second electrode of the third transistor T3 may be connected to the (4-1)th transistor T41 and the (4-2)th transistor T42. The gate electrode of the third transistor T3 may be connected to an emission signal line 515 for supplying an emission signal EM (n). The emission signal EM (n) may correspond to the (n)th emission signal EM (n) supplied to the (n)th row when the pixel circuit 500 is disposed in the (n)th pixel row (where 'n' is a positive integer). The third transistor T3 may be turned-on or turned-off by the emission signal. A second electrode of the third transistor T3 may be connected to a reference voltage line 511 for supplying a reference voltage Vref, for example, the second power line 440 of FIG. 4.

In the aspect, the (4-1)th transistor T41 may be connected to at least one of the first transistor T1, the third transistor T3, and the first light emitting element ED1. For example, a first electrode of the (4-1)th transistor T41 may be connected to the third transistor T3. A second electrode of the (4-1)th transistor T41 may be connected to the first transistor T1 and the first light emitting element ED1. The gate electrode of the (4-1)th transistor T41 may be connected to the (n–1)th scan line 513. Accordingly, the (4-1)th transistor T41 may be supplied with the (n–1)th scan signal, and may be turned-on or turned-off by the (n–1)th scan signal.

In the aspect, the (4-2)th transistor T42 may be connected to at least one of the second transistor T2, the third transistor T3, and the second light emitting element EG2. For example, a first electrode of the (4-2)th transistor T42 may be connected to the third transistor T3. A second electrode of the (4-2)th transistor T42 may be connected to the second transistor T2 and the second light emitting element ED2. The gate electrode of the (4-2)th transistor T42 may be connected to the (n–1)th scan line 513. Accordingly, the (4-2)th transistor T42 may be supplied with the (n–1)th scan signal Scan (n–1), and may be turned-on or turned-off by the (n–1)th scan signal Scan (n–1).

In the aspect, the fifth transistor T5 may be connected to at least one of the driving transistor DT, the (4-1)th transistor T41, the (4-2)th transistor T42, the capacitor C1, the first transistor T1, and the second transistor T2. For example, a first electrode of the fifth transistor T5 may be connected to the driving transistor DT and the capacitor C1. A second electrode of the fifth transistor T5 may be connected to the driving transistor DT, the first transistor T1, and the second transistor T2. The gate electrode of the fifth transistor T5 may be connected to the (n–1)th scan line 513 for supplying the scan signal Scan in the (n–1)th row. The fifth transistor T5 may be supplied with the (n–1)th scan signal Scan (n–1), and may be turned-on or turned-off by the (n–1)th scan signal Scan (n–1).

In the aspect, the sixth transistor T6 may be connected to at least one of the third transistor T3 and the capacitor C1. For example, a first electrode of the sixth transistor T6 may be connected to the third transistor T3 and the capacitor C1. A second electrode of the sixth transistor T6 may be connected to a data line 516 for supplying a data voltage Vdata. The gate electrode of the sixth transistor T6 may be connected to the (n)th scan line 518 for supplying the (n)th scan signal Scan (n). The sixth transistor T6 may be supplied with the (n)th scan signal Scan (n) and may be turned-on or turned-off by the (n)th scan signal Scan (n). When the sixth transistor T6 is turned-on, the data voltage Vdata may be transferred from the second electrode to the first electrode.

In the aspect, the first light emitting element ED1 and/or the second light emitting element ED2 may be connected to a third power line 519 for supplying the low-potential power voltage ELVSS, for example, third power line 435 of FIG. 4. For example, a cathode electrode of the first light emitting element ED1 and a cathode electrode of the second light emitting element ED2 may be connected to the third power line 519 and may be supplied with the low-potential power voltage ELVSS.

According to the aspect, the low-potential power voltage may include a ground (or ground voltage, 0 V (volt)). For example, the cathode electrode of the first light emitting element ED1 and the cathode electrode of the second light emitting element ED2 may be supplied with a voltage corresponding to the ground.

FIG. 6 shows a pixel circuit 600 according to another aspect, which is different from FIG. 5. Hereinafter, the same content as that of FIG. 5 may be omitted. The pixel circuit 600 of FIG. 6 may include nine transistors and one capacitor. At least some of the nine transistors included in the pixel circuit 600 may be an n-type transistor or a p-type transistor.

Referring to FIG. 6, the pixel circuit 600 may include the seventh transistor T7. The seventh transistor T7 may be connected to at least one of the first transistor T1, the second transistor T2, the fifth transistor T5, and the driving transistor DT. For example, a first electrode of the seventh transistor T7 may be connected to at least one of the fifth transistor T5 and the driving transistor DT. A second electrode of the seventh transistor T7 may be connected to at least one of the first transistor T1 and the second transistor T2.

In the aspect, a gate electrode of the seventh transistor T7 may be coupled with an emission signal line 610 for providing an emission signal EM (n). The seventh transistor T7 may be turned-on or turned-off by the emission signal EM (n). When the seventh transistor T7 is turned-on, a voltage (or current) may be provided from the first electrode of the seventh transistor T7 to the second electrode of the seventh transistor T7.

Figure 7:
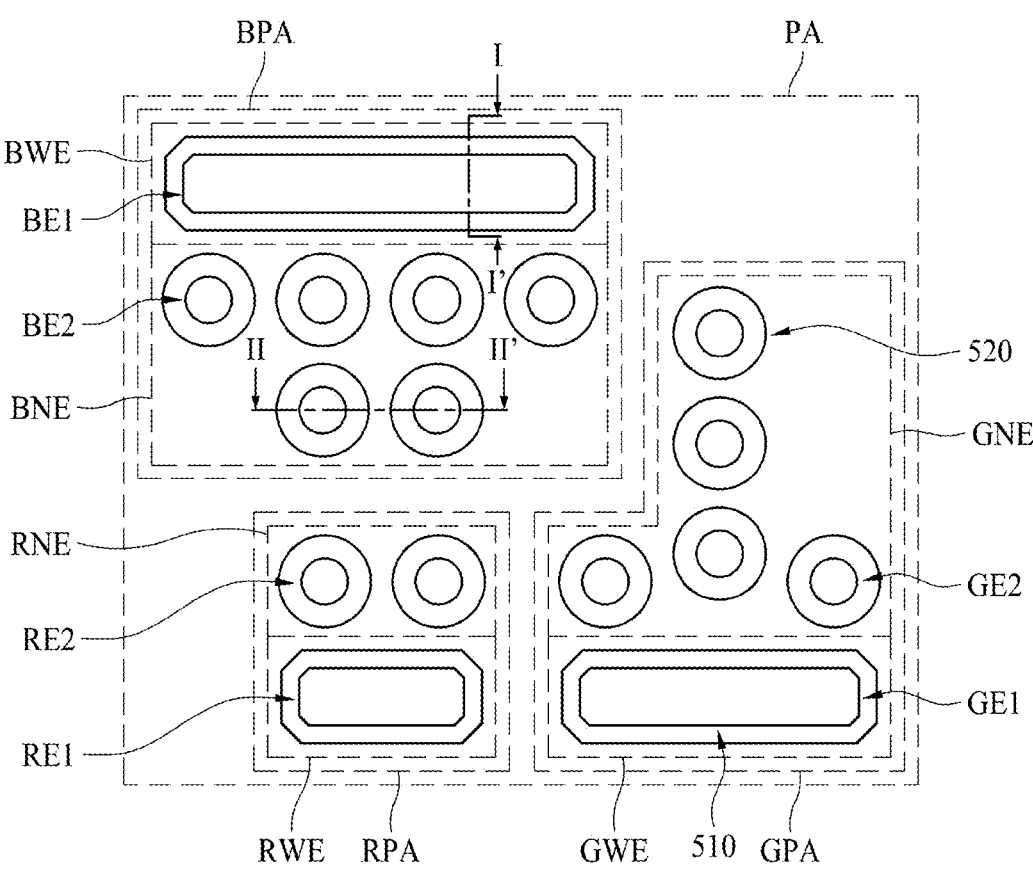
FIG. 7 illustrates an example of lens arrangement included in the display apparatus according to the aspect of the present disclosure.
Figure 8:
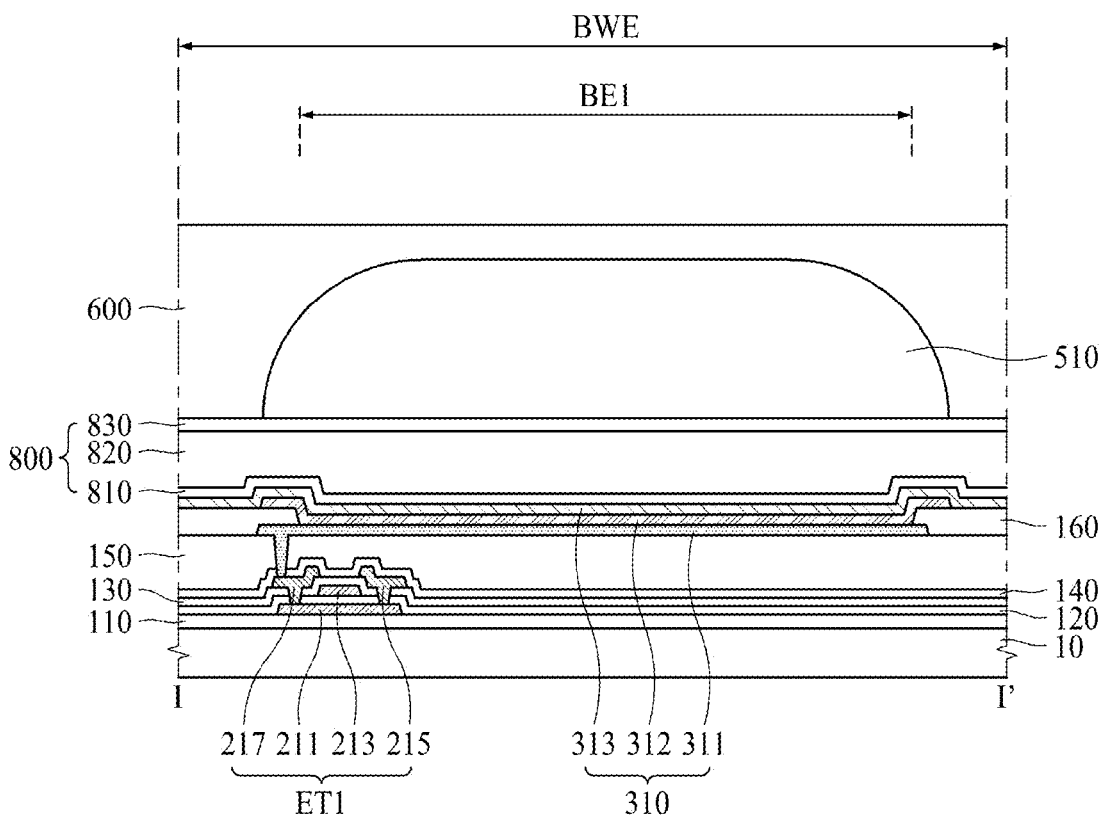
FIG. 8 is a cross-sectional view along line I-I' of FIG. 7.
Figure 9:
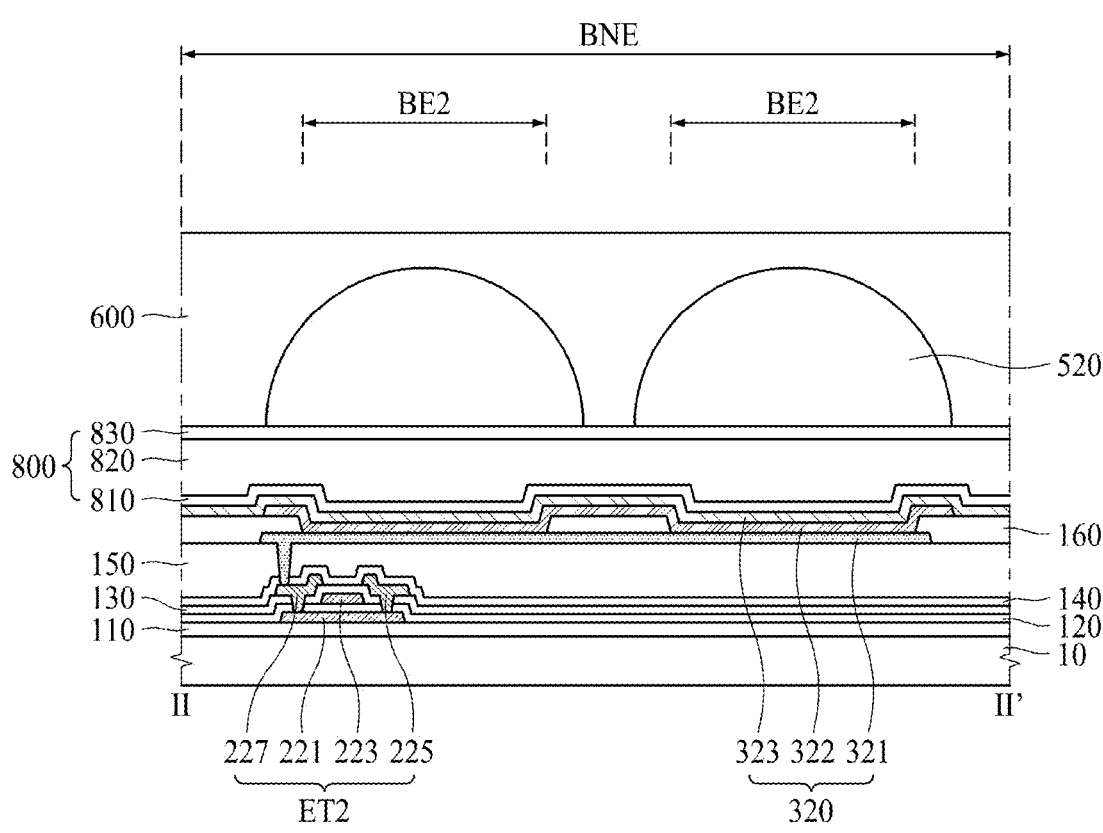
FIG. 9 is a cross-sectional view along line II-II' of FIG. 7.

FIG. 7 illustrates a plane of a portion of a display apparatus according to the aspect of the present disclosure. FIG. 7 shows a plane of a pixel area PA with three subpixels arranged therein. FIG. 8 is a cross-sectional view along line I-I' of FIG. 7, and FIG. 9 is a cross-sectional view along line II-II' of FIG. 7. Hereinafter, a detailed description will be provided with reference to FIGS. 7 to 9.

In FIG. 7, the pixel area PA may include a blue subpixel area BPA for implementing blue color, a red subpixel area RPA for implementing red color, and a green subpixel area GPA for implementing green color. According to the aspects, the blue subpixel area BPA may correspond to a first subpixel, the red subpixel area RPA may correspond to a second subpixel, and the green subpixel area GPA may correspond to a third subpixel. Each of the subpixels may correspond to a pixel circuit. A corresponding pixel circuit may be disposed for each of the subpixels.

The pixel area PA may include a first lens area BWE, RWE, and GWE and a second lens area BNE, RNE, and GNE for providing different viewing angles. The second lens area BNE, RNE, and GNE of each pixel area PA may operate independently to the first lens area BWE, RWE, and GWE of the corresponding pixel area PA. For example, each pixel area PA may include a first light emitting element 310 (e.g., the first light emitting element 310 of FIG. 8) provided on the first lens area BWE, RWE, and GWE of the corresponding pixel area PA and a second light emitting element 320 (e.g., the second light emitting element 320 of FIG. 9) provided on the second lens area BNE, RNE, and GNE of the corresponding pixel area PA.

The first light emitting element 310 may emit light of a specific color. For example, the first light emitting element 310 may include a first lower electrode 311, a first emission layer 312, and a first upper electrode 313 which are sequentially stacked on a substrate 10. The substrate 10 may include an insulating material. The substrate 10 may include a transparent material. For example, the substrate 10 may include glass or plastic.

The first lower electrode 311 may include a conductive material. The first lower electrode 311 may include a material having high reflectance. For example, the first lower electrode 311 may include metal such as aluminum Al and silver Ag. The first lower electrode 311 may have a multi-layered structure. For example, the first lower electrode 311 may have a structure in which a reflective electrode made of metal is disposed between transparent electrodes made of a transparent conductive material such as ITO and IZO.

The first emission layer 312 may generate light of luminance corresponding to a voltage difference between the first lower electrode 311 and the first upper electrode 313. For example, the first emission layer 312 may include an emission material layer EML including a light emitting material.

The light emitting material may include an organic material, an inorganic material, or a hybrid material.

The first emission layer 312 may have a multi-layered structure. For example, the first emission layer 312 may further include at least one of a hole injection layer HIL, a hole transport layer HTL, an electron transport layer ETL, and an electron injection layer EIL.

The first upper electrode 313 may include a conductive material. The first upper electrode 313 may include a material different from that of the first lower electrode 311. A transmittance of the first upper electrode 313 may be higher than a transmittance of the first lower electrode 311. For example, the first upper electrode 313 may be a transparent electrode made of a transparent conductive material such as indium tin oxide ITO and indium zinc oxide IZO. Accordingly, in the display apparatus according to the aspect of the present disclosure, light generated by the first emission layer 312 may be emitted through the first upper electrode 313.

The second light emitting element 320 may implement the same color as that of the first light emitting element 310. The second light emitting element 320 may have the same structure as that of the first light emitting element 310. For example, the second light emitting element 320 may include a second lower electrode 321, a second emission layer 322, and a second upper electrode 323 which are sequentially stacked on the substrate 10.

The second lower electrode 321 may correspond to the first lower electrode 311, the second emission layer 322 may correspond to the first emission layer 312, and the second upper electrode 323 may correspond to the first upper electrode 313. For example, the second lower electrode 321 may be formed with the same structure as the first lower electrode 311. This may be identically applied in the second emission layer 322 and the second upper electrode 323. For example, the first light emitting element 310 and the second light emitting element 320 may have the same structure, but not limited thereto. If needed, at least some configurations of the first light emitting element 310 and the second light emitting element 320 may be formed differently according to circumstances.

In the aspect, the second emission layer 322 may be spaced apart from the first emission layer 312. Accordingly, in the display apparatus according to the aspect of the present disclosure, it is possible to prevent a light emission caused by a leakage current.

In the display apparatus according to the aspect of the present disclosure, light may be generated only in one of the first emission layer 312 and the second emission layer 322 according to a user selection or a predetermined condition.

In the aspect, the first light emitting element 310 and the second light emitting element 320 of the pixel area PA may be disposed on the driving portion (e.g., driving portion DC of FIG. 3) of the corresponding pixel area PA. For example, at least one insulating film, for example, a device buffer film 110, a gate insulating film 120, an insulating interlayer 130, a lower protective film 140, and an overcoat layer 150 are disposed on the substrate 10, and the first light emitting element 310 and the second light emitting element 320 of each pixel area PA may be disposed on one of the insulating films. Accordingly, in the display apparatus according to the aspect of the present disclosure, it is possible to prevent the first light emitting element 310 and the second light emitting element 320 of each pixel area PA from being unnecessarily connected to the driving portion DC of the corresponding pixel area PA.

In the aspect, the buffer film 110, the gate insulating film 120, the insulating interlayer 130, the lower protective film 140, and the overcoat layer 150 may be stacked on the substrate 10. The buffer film 110 may include an insulating material. For example, the buffer film 110 may include an inorganic insulating material such as silicon oxide SiOx and silicon nitride SiNx. The buffer film 110 may have a multi-layered structure. For example, the buffer film 110 may have a stacked structure of a layer formed of silicon nitride SiNx and a layer formed of silicon oxide SiOx.

In the aspect, the buffer film 110 may be disposed between the substrate 10 and the driving portion DC of each pixel area PA. The buffer film 110 may prevent contamination caused by the substrate 10 in a process of forming the driving portion DC. For example, the upper surface of the substrate 10 confronting the driving portion DC of each pixel area PA may be covered by the buffer film 110. The driving portion DC of each pixel area PA may be disposed on the buffer film 110.

In the aspect, the gate insulating film 120 may include an insulating material. For example, the gate insulating film 120 may include an inorganic insulating material such as silicon oxide SiOx or silicon nitride SiNx. The gate insulating film 120 may include a material having a high dielectric constant. For example, the gate insulating film 120 may include a high-k material such as hafnium oxide HfO. The gate insulating film 120 may have a multi-layered structure.

The gate insulating film 120 may be disposed on the buffer film 110. The gate insulating film 120 may extend to a portion between the semiconductor layer of the transistor and the gate electrode. For example, the gate electrode of the switching transistor ST and the driving transistor DT may be insulated from the semiconductor layer of the switching transistor ST and the driving transistor DT by the gate insulating film 120. The gate insulating film 120 may cover first and second semiconductor layers of each pixel area PA. The gate electrode of the switching transistor ST and the driving transistor DT may be disposed on the gate insulating film 120.

The insulating interlayer 130 may include an insulating material. For example, the insulating interlayer 130 may include an inorganic insulating material such as silicon oxide SiOx and silicon nitride SiNx. The insulating interlayer 130 may be disposed on the gate insulating film 120. The insulating interlayer 130 may extend to a portion between the gate electrode and the source electrode of each of the driving transistor DT and the switching transistor ST and between the gate electrode and the drain electrode of each of the driving transistor DT and the switching transistor ST. For example, the source electrode and the drain electrode of each of the driving transistor DT and the switching transistor ST may be insulated from the gate electrode by the insulating interlayer 130. The insulating interlayer 130 may cover the gate electrode of each of the driving transistor DT and the switching transistor ST. The source electrode and the drain electrode of each pixel area PA may be disposed on the insulating interlayer 130. The gate insulating film 120 and the insulating interlayer 130 may expose a source region and a drain region of each semiconductor pattern disposed in each pixel area PA.

In the aspect, the lower protective film 140 may include an insulating material. For example, the lower protective film 140 may include an inorganic insulating material such as silicon oxide SiOx and silicon nitride SiNx. The lower protective film 140 may be disposed on the insulating interlayer 130. The lower protective film 140 may prevent the driving portion DC from being damaged by external moisture and impact. The lower protective film 140 may extend along the surface of the switching transistor ST and the driving transistor DT opposite to the substrate 10. The lower protective film 140 may be in contact with the insulating interlayer 130 outside the driving portion DC provided in the pixel area PA.

The overcoat layer 150 may include an insulating material. The overcoat layer 150 may include a material different from that of the lower protective film 140. For example, the overcoat layer 150 may include an organic insulating material. The overcoat layer 150 may be disposed on the lower protective film 140. The overcoat layer 150 may remove a step difference caused by the driving portion DC of each pixel area PA. For example, the upper surface of the overcoat layer 150 facing the device substrate 10 may be a flat surface.

In the aspect, the first transistor ET1 may be electrically connected between the drain electrode of the driving transistor DT and the first lower electrode 311 of the first light emitting element 310. The second transistor ET2 may be electrically connected between the drain electrode of the driving transistor DT and the second lower electrode 321 of the second light emitting element 320.

The first transistor ET1 may include a first semiconductor layer 211, a first gate electrode 213, a first source electrode 215, and a first drain electrode 217. The first transistor ET1 may have the same structure as the switching transistor ST and the driving transistor DT. For example, the first semiconductor layer 211 is positioned between the buffer film 110 and the gate insulating film 120, and the first gate electrode 213 may be positioned between the gate insulating film 120 and the insulating interlayer 130. The first source electrode 215 and the first drain electrode 217 may be positioned between the insulating interlayer 130 and the lower protective film 140. The first gate electrode 213 may overlap with a channel region of the first semiconductor layer 211. The first source electrode 215 may be electrically connected to a source region of the first semiconductor layer 211. The first drain electrode 217 may be electrically connected to a drain region of the first semiconductor layer 211.

In the aspect, the second transistor ET2 may include a second semiconductor layer 221, a second gate electrode 223, a second source electrode 225, and a second drain electrode 227. For example, the second semiconductor layer 221 is disposed on the same layer as the first semiconductor layer 211, the second gate electrode 223 is disposed on the same layer as the first gate electrode 213, and the second source electrode 225 and the second drain electrode 227 may be disposed on the same layer as the first source electrode 215 and the first drain electrode 217.

In the aspect, the first transistor ET1 may be formed simultaneously with the switching transistor ST and the driving transistor DT. The first transistor ET1 may be formed simultaneously with the second transistor ET2.

The first light emitting element 310 and the second light emitting element 320 of each pixel area PA may be provided on the overcoat layer 150 of the corresponding pixel area PA. For example, the first lower electrode 311 of the first light emitting element 310 is electrically connected to the first drain electrode 217 (or the first source electrode 215) of the first transistor ET1 through a contact hole passing through the lower protective film 140 and the overcoat layer 150, and the second lower electrode 321 of the second light emitting element 320 may be electrically connected to the second drain electrode 227 (or the second source electrode 225) of the second transistor ET2 through a contact hole passing through the lower protective film 140 and the overcoat layer 150.

The second lower electrode 321 of each pixel area PA may be spaced apart from the first lower electrode 311 of the corresponding pixel area PA. For example, a bank insulating film 160 may be disposed between the first lower electrode 311 and the second lower electrode 321 of each pixel area PA. The bank insulating film 160 may include an insulating material. For example, the bank insulating film 160 may include an organic insulating material. The bank insulating film 160 may include a material different from that of the overcoat layer 150.

The second lower electrode 321 of each pixel area PA may be insulated from the first lower electrode 311 of the corresponding pixel area PA by the bank insulating film 160. For example, the bank insulating film 160 may cover the edge of the first lower electrode 311 and the edge of the second lower electrode 321 provided in each pixel area PA. Thus, in the display apparatus, an image by the first lens area BWE, RWE, and GWE of each pixel area PA in which the first light emitting element 310 is disposed or an image by the second lens area BNE, RNE, and GNE of each pixel area PA in which the second light emitting element 320 is disposed may be provided to a user.

The first emission layer 312 and the first upper electrode 313 of the first light emitting element 310 disposed in each pixel area PA may be stacked on a portion of the corresponding first lower electrode 311 exposed by the bank insulating film 160. The second emission layer 322 and the second upper electrode 323 of the second light emitting element 320 disposed in each pixel area PA may be stacked on a portion of the corresponding second lower electrode 321 exposed by the bank insulating film 160. For example, the bank insulating film 160 may divide each pixel area into a first light emitting area BE1, RE1, and GE1 in which light by the first light emitting element 310 is emitted and a second light emitting area BE2, RE2, and GE2 in which light by the second light emitting element 320 is emitted. The size of the second light emitting areas BE2, RE2, and GE2 divided in each pixel area PA may be smaller than the size of the first light emitting areas BE1, RE1, and GE1.

The second upper electrode 323 of each pixel area PA may be electrically connected to the first upper electrode 313 of the corresponding pixel area PA. For example, the voltage applied to the second upper electrode 323 of the second light emitting element 320 disposed in each pixel area PA may be the same as the voltage applied to the first upper electrode 313 of the first light emitting element 310 disposed in the corresponding pixel area PA. The second upper electrode 323 of each pixel area PA may include the same material as that of the first upper electrode 313 of the corresponding pixel area PA. For example, the second upper electrode 323 of each pixel area PA may be formed simultaneously with the first upper electrode 313 of the corresponding pixel area PA. The second upper electrode 323 of each pixel area PA may extend onto the bank insulating film 160, whereby the second upper electrode 323 may be in direct contact to the first upper electrode 313 of the corresponding pixel area PA. A luminance of the first lens area BWE, RWE, and GWE provided in each pixel area PA and a luminance of the second lens area BNE, RNE, and GNE may be controlled by a driving current generated in the corresponding pixel area PA.

An encapsulation member 800 may be disposed on the first light emitting element 310 and the second light emitting element 320 of each pixel area PA. The encapsulation member 800 may prevent the light emitting elements 310 and 320 from being damaged by moisture and impact from the outside. The encapsulation member 800 may have a multi-layered structure. For example, the encapsulation member 800 may include a first encapsulation layer 810, a second encapsulation layer 820, and a third encapsulation layer 830 which are sequentially stacked, but not limited thereto. The first encapsulation layer 810, the second encapsulation layer 820, and the third encapsulation layer 830 may include an insulating material. The second encapsulation layer 820 may include a material different from that of the first encapsulation layer 810 and the third encapsulation layer 830. For example, the first encapsulation layer 810 and the third encapsulation layer 830 may be inorganic encapsulation layers including an inorganic insulating material, and the second encapsulation layer 820 may include an organic encapsulation layer including an organic insulating material. Accordingly, it is possible to prevent the light emitting elements 310 and 320 of the display apparatus from being damaged by moisture and impact from the outside.

A first lens 510 and a second lens 520 may be provided on the encapsulation member 800 of each pixel area PA. Throughout this description, the first lens 510 of the first lens area and the second lens 520 of the second lens area may be considered to be optical control elements capable of controlling the viewing angle of light emitted therefrom.

The first lens 510 may be provided on the first lens area BWE, RWE, and GWE of each pixel area PA. For example, the light generated by the first light emitting element 310 of each pixel area PA may be emitted through the first lens 510 of the corresponding pixel area PA. The first lens 510 may have a shape in which light in at least one direction may not be limited. For example, the first lens 510 provided in each pixel area PA may be planar, and may have a bar shape, a rectangular shape, or generally any polygon shape extending in a first direction, where the first direction and a second direction are perpendicular to one another, the first direction being longer than the second direction. The corners of the first lens 510 may be tapered, or chamfered.

In this case, a traveling direction of light emitted from the first lens area BWE, RWE, and GWE of the pixel area PA may not be limited in the first direction. For example, the content (or image) provided through the first lens area BWE, RWE, and GWE of the pixel area PA may be shared with surrounding people adjacent to a user in the first direction. When the content is provided through the first lens area BWE, RWE, and GWE, content may be referred to as a first mode in which the content is provided in a first viewing angle range wider than a second viewing angle range provided by the second lens area BNE, RNE, and GNE.

The second lens 520 may be provided on the second lens area BNE, RNE, and GNE of each pixel area PA. The light generated by the second light emitting element 320 of the pixel area PA may be emitted through the second lens 520 of the corresponding pixel area PA. The second lens 520 may limit a traveling direction of light passing through the second lens 520 in a first direction and/or a second direction. For example, the second lens 520 provided in the pixel area PA may be planar, and may have a circular, or oval shape. In this case, the traveling direction of light emitted from the second lens area BNE, RNE, and GNE of the pixel area PA may be limited in the first direction and the second direction. For example, the contents provided by the second lens area BNE, RNE, and GNE of the pixel area PA may not be shared (seen) by people around a user. If providing the content through the second lens area BNE, RNE, and GNE, it may be referred to as a second mode in which the content is provided in a second viewing angle range narrower than the first viewing angle range provided by the first lens area BWE, RWE, and GWE.

The first light emitting area BE1, RE1, and GE1 included in the first lens area BWE, RWE, and GWE of each pixel area PA may have a shape corresponding to the first lens 510 provided on the first lens area BWE, RWE, and GWE of the corresponding pixel area PA. For example, the first light emitting area BE1, RE1, and GE1 defined in the first lens area BWE, RWE, and GWE of each pixel area PA may be planar, and may have a bar shape a rectangular shape, or generally any polygon shape extending in a first direction, where the first direction and a second direction are perpendicular to one another, the first direction being longer than the second direction. The corners of the first lens 510 may be tapered, or chamfered. The first lens 510 provided on the first lens area BWE, RWE, and GWE of the pixel area PA may have a size greater than that of the first light emitting area BE1, RE1, and GE1 included in the first lens area BWE, RWE, and GWE of the corresponding pixel area PA. Accordingly, it is possible to improve the efficiency of light emitted from the first light emitting areas BE1, RE1, and GE1 of the pixel area PA.

The second light emitting areas BE2, RE2, and GE2 included in the second lens area BNE, RNE, and GNE of each pixel area PA may have a shape corresponding to the second lens 520 provided on the second lens area BNE, RNE, and GNE of the corresponding pixel area PA. For example, the second light emitting areas BE2, RE2, and GE2 included in the second lens area BNE, RNE, and GNE of the pixel area PA may be planar, and may have a circular or oval shape. The second lens 520 provided on the second lens area BNE, RNE, and GNE of the pixel area PA may have a size greater than that of the second light emitting area BE2, RE2, and GE2 included in the second lens area BNE, RNE, and GNE of the corresponding pixel area PA. For example, the planar shape of the second light emitting area BE2, RE2, and GE2 provided in the second lens area BNE, RNE, and GNE of each pixel area PA may be concentric with the planar shape of the second lens 520 provided on the second lens area BNE, RNE, and GNE of the corresponding pixel area PA. In this case, it is possible to improve the efficiency of light emitted from the second light emitting area BE2, RE2, and GE2 of the pixel area PA.

In the aspect, the first lens area BWE, RWE, and GWE of the pixel area PA may include one first light emitting area BE1, RE1, and GE1. The second lens area BNE, RNE, and GNE of the pixel area PA may include the plurality of second light emitting areas BE2, RE2, and GE2.

In the aspect, one first lens 510 may be disposed on the first lens area BWE, RWE, and GWE of the pixel area PA. The plurality of second lenses 520 may be disposed on the second lens area BNE, RNE, and GNE of the pixel area PA.

According to one aspect, the second light emitting areas BE2, RE2, and GE2 included in the second lens area BNE, RNE, and GNE of the pixel area PA may be driven for each subpixel area. Also, the second light emitting areas (e.g., second light emitting areas BE2, the second light emitting areas RE2, or the second light emitting areas GE2) included in one subpixel area may be simultaneously driven.

In the aspect, one second lower electrode 321 may be provided on the second lens area BNE, RNE, and GNE of each pixel area PA. Between the second light emitting areas BE2, RE2, and GE2, the bank insulating film 160 may be provided between the second lower electrode 321 and the second emission layer 322. Between the second light emitting areas BE2, the second light emitting areas RE2, and/or the second light emitting areas GE2, the bank insulating film 160 may be provided between the second lower electrode 321 and the second emission layer 322. Between the second light emitting areas BE2, RE2, and GE2 of each of the second lens areas BNE, RNE, and GNE, the second emission layer 322 may be spaced apart from the second lower electrode 321 by the bank insulating film 160. In this case, it is possible to improve the luminous efficiency of the second light emitting areas BE2, RE2, and GE2.

In the aspect, the area of each of the second light emitting areas BE2, RE2, and GE2 provided in the second lens area BNE, RNE, and GNE of the pixel area PA may be designated as a specific value. For example, the area of each of the second light emitting areas BE2, RE2, and GE2 provided in the second lens area BNE, RNE, and GNE may be implemented to be the same as each other. Each of the second light emitting areas BE2, RE2, and GE2 provided in the second lens area BNE, RNE, and GNE of the pixel area PA may have the same area as each of the second light emitting areas BE2, RE2, and GE2 included in the second lens area BNE, RNE, and GNE of the adjacent pixel area PA.

In the aspect, the number of second light emitting areas may be different for each subpixel area RPA, GPA, and BPA. For example, the number of second light emitting areas BE2 defined in the second lens area BNE of the blue subpixel area BPA may be greater than the number of second light emitting areas RE2 defined in the second lens area RNE of the red subpixel area RPA. The number of second light emitting areas RE2 defined in the second lens area RNE of the red subpixel area RPA may be greater than the number of second light emitting areas GE2 defined in the second lens area GNE of the green subpixel area GPA. In this case, the efficiency deviation of the second light emitting element 320 provided on the second lens area BNE, RNE, and GNE of the pixel area PA may be supplemented by the number of second light emitting areas BE2, RE2, and GE2 defined in the second lens area BNE, RNE, and GNE of each pixel area PA.

In the aspect, the sizes of the first light emitting areas BE1, RE1, and GE1 may be different for each of the subpixel areas BPA, RPA, and GPA. For example, the first light emitting area BE1 of the blue subpixel area BPA may have a different size from the first light emitting area RE1 of the red subpixel area RPA and may have a different size from the first light emitting area GE1 of the green subpixel area GPA. The size of the first light emitting area BE1 of the blue subpixel area BPA may be greater than the size of the first light emitting area RE1 of the red subpixel area RPA. The size of the first light emitting area RE1 of the red subpixel area RPA may be greater than the size of the first light emitting area GE1 of the green subpixel area GPA. Accordingly, in the display apparatus according to the aspect of the present disclosure, the efficiency deviation of the first light emitting element 310 provided on the first lens area BWE, RWE, and GWE of each pixel area PA may be supplemented by the size of the first light emitting areas BE1, RE1, and GE1 defined in the first lens area BWE, RWE, and GWE of each pixel area PA.

In the aspect, a lens protection film 600 may be provided on the first lens 510 and the second lens 520 of the pixel area PA. The lens protection film 600 may include an insulating material. For example, the lens protection film 600 may include an organic insulation material. The refractive index of the lens protection film 600 may be smaller than the refractive index of the first lens 510 and the refractive index of the second lens 520 provided in each pixel area PA. Accordingly, in the display apparatus according to the aspect of the present disclosure, the light passing through the first lens 510 and the second lens 520 of each pixel area PA may not be reflected in the direction of the substrate 10 due to the difference in refractive index with the lens protection film 600.

Figure 10:
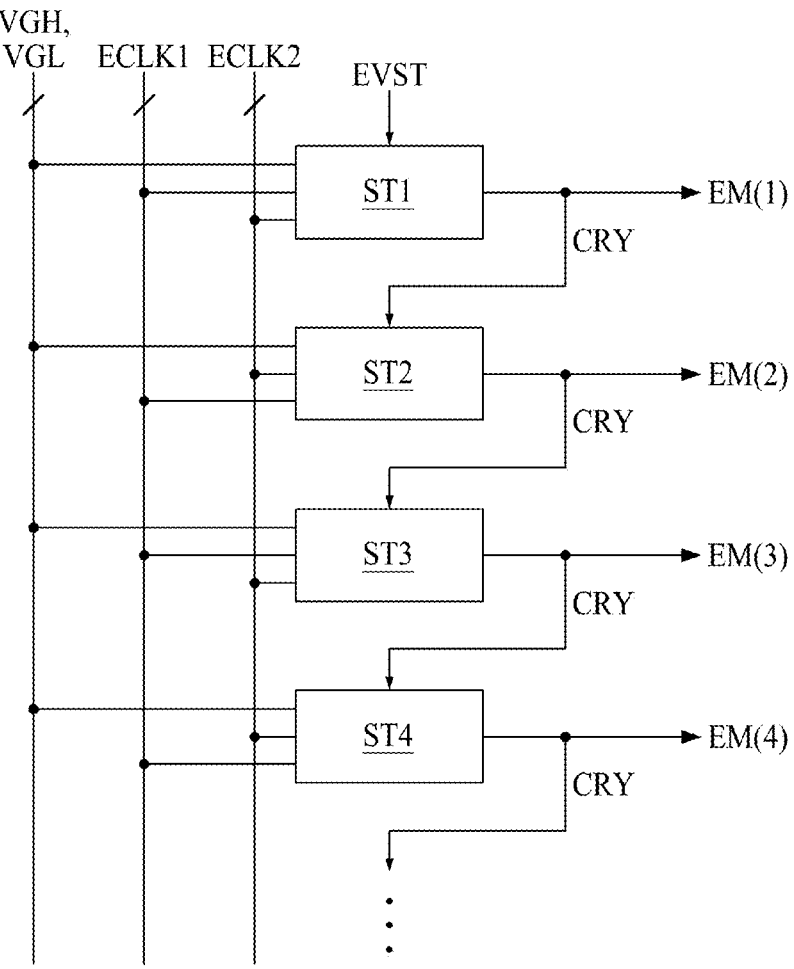
FIG. 10 is a diagram illustrating a gate driving circuit of the display apparatus according to the aspect of the present disclosure.

FIG. 10 is a diagram illustrating a gate driving circuit of a display apparatus according to the aspect of the present disclosure. FIG. 10 is a functional block diagram of an emission driver 1000 included in the gate driving circuit. The emission driver 1000 may generate an emission signal (e.g., emission signal EM (n)).

Referring to FIG. 10, the emission driver 1000 may be implemented as a gate shift register including a plurality of stages (e.g., a first stage ST1, a second stage ST2, a third stage ST3, and a fourth stage ST4), dependent on the size of the display panel. The stage may be formed in a gate in panel (GIP) manner, which is a method of being disposed in a panel, but not limited thereto. For example, the stage may be arranged separately from the panel.

In the aspect, each of the plurality of stages ST1 to ST4 may sequentially activate an operation according to a start signal, to thereby output an emission signal. The first stage ST1 may refer to a stage disposed at the uppermost end of the emission driver. The second to fourth stages ST2 to ST4 may refer to stages sequentially disposed following the first stage ST1.

In the aspect, an operation of the first stage ST1 is activated according to an external start signal EVST, and an operation of the second stage ST2 and the remaining stages (e.g., the third stage ST3 and the fourth stage ST4) may be activated according to a signal of the previous stage, for example, the emission signal. The signal of the previous stage which activates an operation of the next stage is an internal start signal, and may be a carry signal CRY. Herein, the term "previous stage" may refer to a stage positioned above a reference stage and configured to generate an emission signal whose phase is earlier than that of an emission signal output from the reference stage.

In the aspect, to output the emission signal, the plurality of stages ST1 to ST4 receive the external start signal EVST, a first clock signal ECLK 1, and a second clock signal ECLK2 from a level shifter (not shown). The external start signal EVST, the first clock signal ECLK1, and the second clock signal ECLK2 may swing between a gate-off voltage VGH and a gate-on voltage VGL. Herein, the gate-off voltage VGH may have a value higher than or lower than the gate-on voltage according to the type of the transistor. For example, when the transistor to which the gate-off voltage is input is the n-type, the gate-off voltage may be higher than the gate-on voltage. For another example, when the transistor to which the gate-off voltage is input is the P-type, the gate-off voltage may be lower than the gate-on voltage.

According to the aspect of the present disclosure, the gate-off voltage VGH is referred to as a gate high voltage, and the gate-on voltage VGL is referred to as a gate low voltage, but not limited thereto. For example, the gate-off voltage VGH may be referred to as a gate low voltage, and the gate-on voltage VGL may be referred to as a gate high voltage, according to the type of the transistor.

The external start signal EVST may be input to the first stage ST1, and the first clock signal ECLK1 and the second clock signal ECLK2 may be input to all the stages ST1 to ST4. The first clock signal ECLK1 and the second clock signal ECLK2 may have opposite phases. According to the aspect, to normally operate each stage connected in a cascade manner, a position at which the first clock signal ECLK1 and the second clock signal ECLK2 are input may be set to be opposite to each other in the odd-numbered stages and the even-numbered stages. For example, when the first clock signal ECLK1 is input to the first terminal in the odd-numbered stages and the second clock signal ECLK2 is input to the second terminal in the odd-numbered states, the first clock signal ECLK1 may be input to the second terminal in the even-numbered stages and the second clock signal ECLK2 may be input to the first terminal in the even-numbered stages.

In the aspect, each of the stages ST1 to ST4 may activate an operation of node Q according to a start signal applied to a start terminal for every frame. Herein, the activation of node indicates that a gate low-potential (low) voltage VGL or a voltage corresponding to the gate low-potential (low) voltage is applied to the node. Meanwhile, the deactivation of node indicates that a gate high-potential (high) voltage VGH or a voltage corresponding thereto is applied to the node. The gate low-potential voltage VGL may be referred to as a gate-on voltage, and the gate high-potential voltage VGH may be referred to as a gate-off voltage.

According to the aspect, as shown in the drawings, each of the stages ST1 to ST4 may be supplied with the gate high-potential voltage VGH and the gate low-potential voltage VGL from an external power supply. The gate high-potential voltage VGH may set in advance to a value between 20 V and 30 V, and the gate low-potential voltage VGL may be preset as a value between −10 V and 0 V, but not limited thereto.

In the aspect, the gate low-potential voltage VGL may be provided through a first voltage line for providing a voltage of a first value. According to one aspect, the first voltage line may be referred to as a low-potential line. The gate high-potential voltage VGH may be provided through a second voltage line for providing a voltage of a second value higher than the first value. According to the aspect, the second voltage line may be referred to as a high-potential line.

The gate driving circuit according to the aspect of the present disclosure may further include a scan driver. The scan driver may generate a scan signal (e.g., the (n)th scan signal Scan (n)) and (n−1)th scan signal (Scan (n−1)). The scan driver may correspond to the emission driver of FIG. 10. For example, the scan driver may include a configuration corresponding to each functional block diagram of the emission driver.

In the aspect, the scan driver and the emission driver may be connected in parallel. The scan driver and the emission driver may be connected in parallel and may be arranged vertically or horizontally, but not limited thereto.

Figure 11:
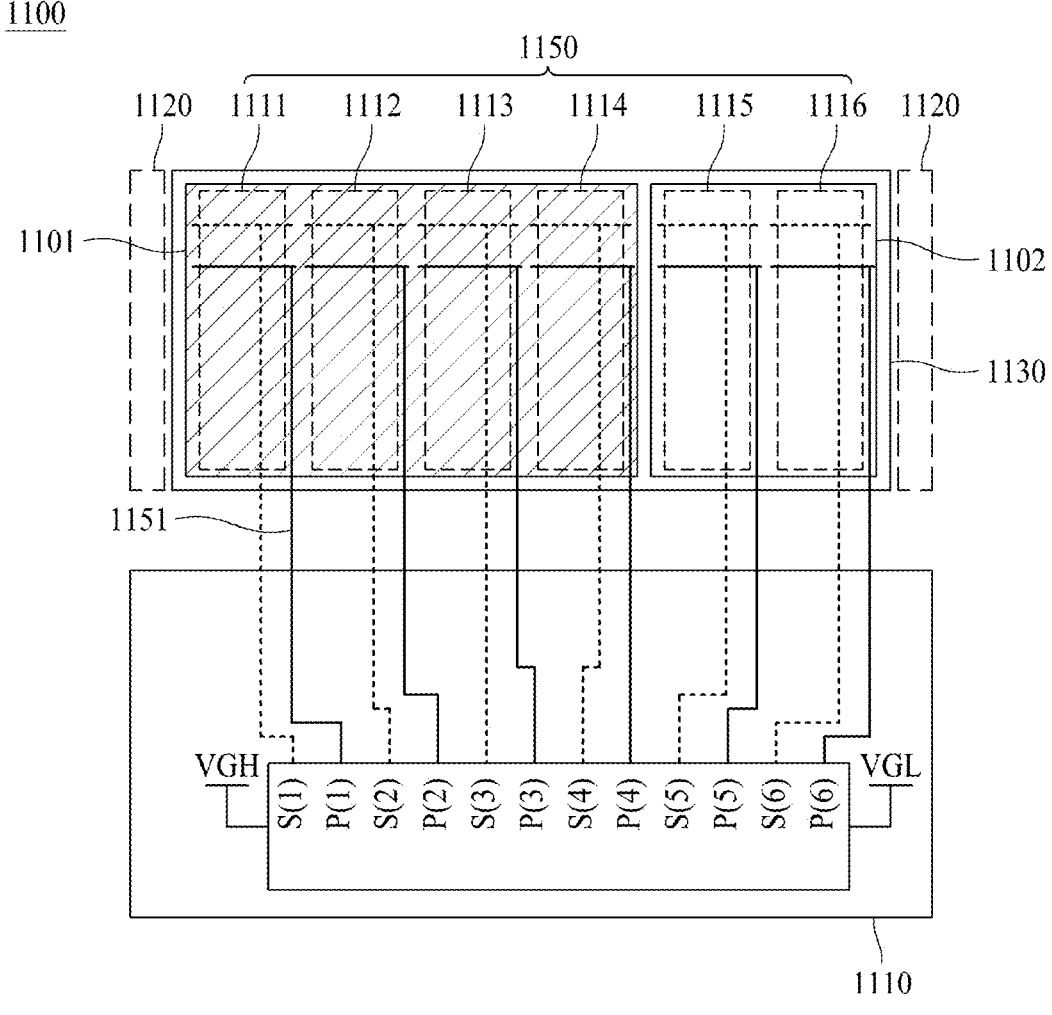
FIGS. 11 to 13 describe a display apparatus according to one aspect of the present disclosure.
Figure 12:
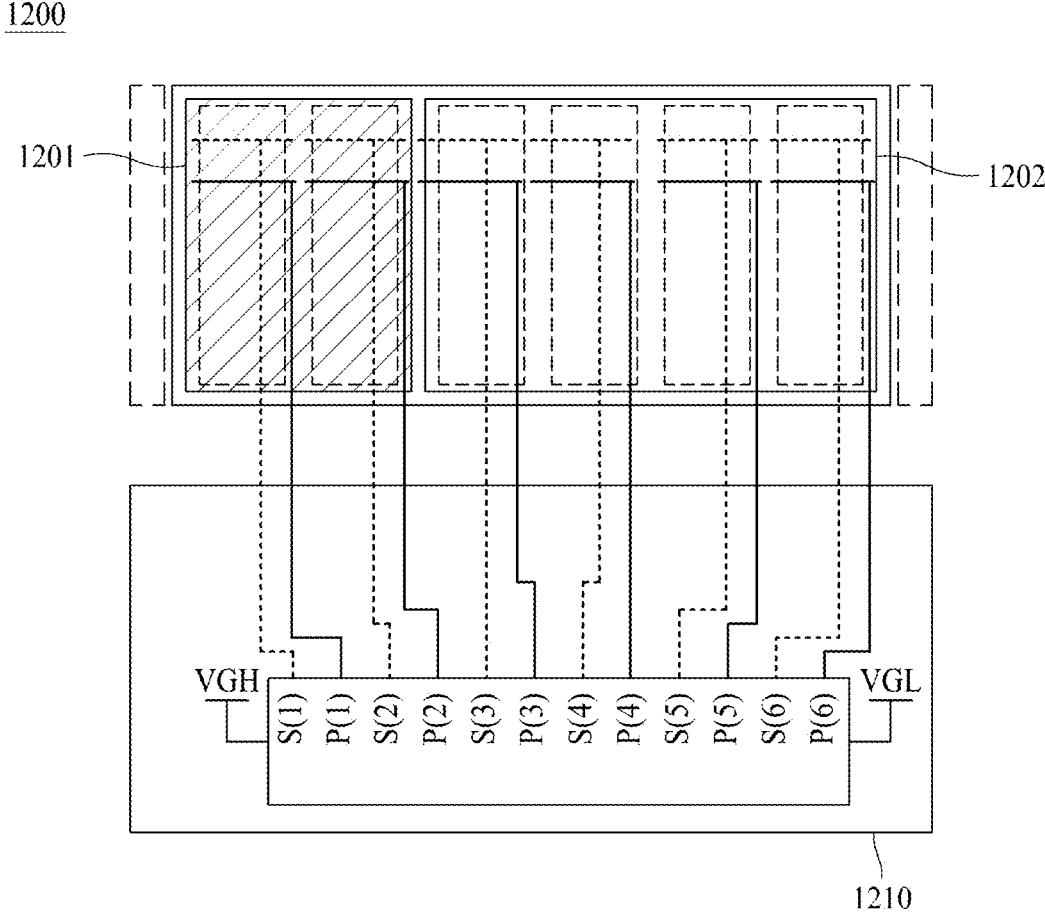
Figure 13:
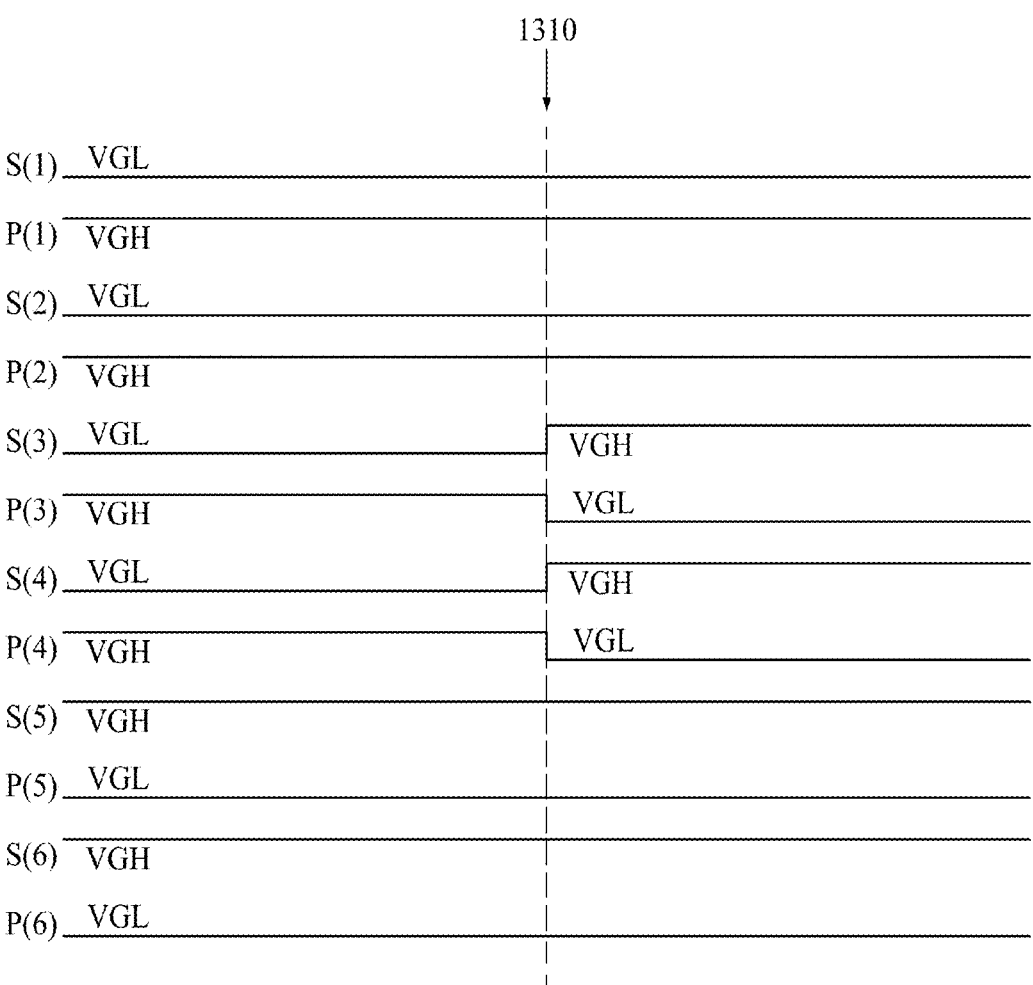

FIGS. 11 to 13 describes a display apparatus according to one aspect of the present disclosure. FIGS. 11 and 12 illustrate that a size of a first area operating in a first mode and a size of a second area operating in a first mode or a second mode are changed. FIG. 13 shows a flow of a signal according to the change in area of FIGS. 11 and 12.

Referring to FIG. 11, a display apparatus 1100 may include a mode controller 1110, a gate driving circuit 1120, a pixel circuit 1150, a first lens, and a second lens. The first lens and the second lens may be arranged on the pixel circuit for each pixel circuit.

In the aspect, the mode controller 1110 may generate the first control signal S(k) ('k' is a natural number) and the second control signal P(k) by using the gate-off voltage VGH and the gate-on voltage VGL. For example, when the mode controller 1110 tries to operate the pixel circuit provided with the first control signal S(k) in the first mode, the mode controller 1110 may control that the first control signal S(k) corresponds to the gate-on voltage VGL and the second control signal P(k) corresponds to the gate-off voltage VGH. When the mode controller 1110 tries to operate the pixel circuit provided with the first control signal S(k) in the second mode, the mode controller 1110 may control that the first control signal S(k) corresponds to the gate-off voltage VGH and the second control signal P(k) corresponds to the gate-on voltage VGL.

According to the aspect, the display apparatus 1100 may further include a power supply which generates the gate-off voltage VGH and the gate-on voltage VGL. In this case, the gate-off voltage VGH and the gate-on voltage VGL may be generated by the power supply and then provided to the mode controller 1110. The gate-off voltage VGH and the gate-on voltage VGL may also be provided to the gate driving circuit 1120.

According to the aspect, the gate driving circuit 1120 may generate an emission signal, for example, emission signal EM (n) of FIGS. 5 and 6. The gate driving circuit 1120 may generate the emission signal by using the gate-off voltage VGH and the gate-on voltage VGL. The gate driving circuit 1120 may provide the emission signal to the pixel circuit 1150.

In the aspect, the gate driving circuit 1120 may be arranged on at least one side of an active region 1130 in which the pixel circuit 1150 is disposed. For example, the gate driving circuit 1120 may be divided into two portions, as shown in the drawings, and may be disposed in left and right sides of the active region 1130, but not limited thereto. For example, the gate driving circuit 1120 may be disposed on at least a portion of the edge of the active region 1130.

In the aspect, the gate driving circuit 1120 may be connected to the mode controller 1110 and/or the power supply. For example, the gate driving circuit 1120 may be connected to the power supply and may be configured to receive the gate-off voltage VGH and the gate-on voltage VGL from the power supply. The gate driving circuit 1120 may generate the signal related to the driving of the pixel circuit 1150, for example, emission signal and/or scan signal, by using the gate-off voltage VGH and the gate-on voltage VGL. The gate driving circuit 1120 may provide the generated signal to the pixel circuit 1150.

In the aspect, the active region 1130 may include an area for emitting light as the pixel circuit 1150 is disposed. FIG. 11 shows an example in which the pixel circuit 1150 is disposed in the active region 1130, but not limited thereto. For example, the active region may be disposed in the pixel circuit 1150 or other components may be included in the active region.

In the aspect, the active region 1130 may include a first region 1101 and a second region 1102. The first region 1101 may include a region operating in the first mode. The second region 1102 may include a region operating in the first mode or second mode. For example, the first region 1101 may include a region fixedly operating in the first mode. The second region 1102 may include a region flexibly operating in the first mode or second mode based on a user input.

Herein, the first mode may include a mode having a first viewing angle during light emission. The second mode may include a mode having a second viewing angle during light emission. The second viewing angle may be smaller than the first viewing angle. In this case, light may be provided to a wider area in the first mode than in the second mode.

FIG. 11 illustrates an example in which the first region 1101 is larger than the second region 1102. For example, four pixel circuits 1111 to 1114 may be included in the first region 1101. Also, two pixel circuits 1115 and 1116 may be included in the second region 1102. Each of the pixel circuits 1111 to 1116 included in the first region 1101 and the second region 1102 may be distinguished from each other and may be connected to the mode controller 1110.

In the aspect, the display apparatus 1100 may include a non-active region in addition to the active region 1130. The non-active region may correspond to a region around the active region 1130. According to the aspect, the active region 1130 may be a display area and the non-active region may be a non-display area. However, the terms are not limited to these terms.

In the aspect, the mode controller 1110 may provide the control signal to the pixel circuit 1150. The mode controller 1110 may provide the control signal, for example, the first control signal S(k) and the second control signal P(k) to each of the pixel circuits 1150.

The first control signal provided to each of the first to sixth pixel circuits 1111 to 1116 in FIG. 11 may be referred to as a (1-1)th control signal S(1), a (1-2)th control signal S(2), a (1-3)th control signal S(3), a (1-4)th control signal S(4), a (1-5)th control signal S(5), and a (1-6)th control signal S(6). The second control signal provided to each of the first to sixth pixel circuits 1111 to 1116 may be referred to as a (2-1)th control signal P(1), a (2-2)th control signal P(2), a (2-3)th control signal P(3), a (2-4)th control signal P(4), a (2-5)th control signal P(5), and a (2-6)th control signal P(6).

In the aspect, the mode controller 1110 may control the mode operation of the pixel circuit 1150 by providing the first control signal S(k) (k=1~6) or the second control signal P (k) (k=1~6) through the control line 1151 connected to each of the pixel circuits 1150. For example, the mode controller 1110 may provide the first control signal to the pixel circuit to be operated in the first mode. The second control signal may be provided to the pixel circuit to be operated in the second mode. Accordingly, the mode controller 1110 may control the mode operation of the pixel circuit 1150.

In the aspect, the operation in the first mode or the second mode may be determined according to the region including the pixel circuit, for example, the first region or the second region and a user's input. For example, the pixel circuit included in the first region may be operated in the first mode. The pixel circuit included in the second region may be operated in the first mode or the second mode according to a user's input.

According to one aspect, the first pixel circuit 1111 to the fourth pixel circuit 1114 may be included in the first region 1101. The first lens and the second lens may be arranged on each of the first to fourth pixel circuits 1111 to 1114. As the first to fourth pixel circuits 1111 to 1114 are disposed in the first region 1101, the first to fourth pixel circuits 1111 to 1114 may operate in the first mode. In this case, the first to fourth pixel circuits 1111 to 1114 may emit light through the first lens corresponding to the first mode. For example, the first pixel circuit 1111 to the fourth pixel circuit 1114 may emit light by using the first light emitting element under the first lens, for example, the first light emitting element ED1 of FIG. 5. While the first pixel circuit 1111 to the fourth pixel circuit 1114 are included in the first region, the second light emitting element (eg, the second light emitting element ED2 of FIG. 5) under the second lens may not operate.

According to one aspect of the present disclosure, the first pixel circuit 1111 may be connected to the (1-1)th control line 1151 providing the (1-1)th control signal S(1). The first pixel circuit 1111 may receive the (1-1)th control signal S(1) through the (1-1)th control line 1151.

According to the aspect, the first pixel circuit 1111 to the fourth pixel circuit 1114 included in the first region 1101 may operate like the first pixel circuit 1111 described above.

For example, as shown in the drawings, each of the second pixel circuit 1112 to the fourth pixel circuit 1114 may be connected to the corresponding first control line, for example, the (1-2)th control line to (1-4)th control line, and receive the (1-2)th control signal S(2) to the (1-4)th control signal S (4).

According to one aspect, the fifth pixel circuit 1115 and the sixth pixel circuit 1116 may be included in the second region 1102. The first lens and the second lens may be arranged on each of the fifth pixel circuit 1115 and the sixth pixel circuit 1116. As the fifth pixel circuit 1115 and the sixth pixel circuit 1116 are disposed in the second region 1102, the fifth pixel circuit 1115 and the sixth pixel circuit 1116 may operate in the first mode or the second mode. In this case, the fifth pixel circuit 1115 and the sixth pixel circuit 1116 may emit light through the first lens corresponding to the first mode or the second lens corresponding to the second mode. For example, when operating in the first mode, the fifth pixel circuit 1115 and the sixth pixel circuit 1116 may perform light emission by using the first light emitting element under the first lens, for example, the first light emitting element ED1 of FIG. 5. When operating in the second mode, the fifth pixel circuit 1115 and the sixth pixel circuit 1116 may perform light emission by using the second light emitting element under the second lens, for example, the second light emitting element ED2 of FIG. 5.

In the aspect, the pixel circuit 1150, for example, the first pixel circuit 1111 to the sixth pixel circuit 1116, may operate in the first mode in which the viewing angle corresponds to the first value on the basis that the first control signal S(k) (k=1~6) corresponds to the gate-on voltage VGL and the second control signal P(k) (k=1~6) corresponds to the gate-off voltage VGH. The pixel circuit 1150, for example, the fifth pixel circuit 1115 and the sixth pixel circuit 1116, may operate in the second mode in which the viewing angle corresponds to the second value on the basis of the first control signal S(5) and S(6) corresponding to the gate-off voltage VGH and the second control signal P(5) and P(6) corresponding to the gate-on signal VGL.

FIG. 11 illustrates the pixel circuit 1150 disposed in the same row for convenience of description, but not limited thereto. The pixel circuit 1150 may be arranged in a matrix form to form a row. An example of a pixel circuit constituting the row may refer to FIGS. 14 and 18.

In the aspect, the display apparatus 100 may be arranged in at least a portion of a vehicle to provide at least first content. The vehicle may include a driving area in which a user controlling the vehicle is provided and a general area in which a passenger is provided. The pixel circuit (eg, first pixel circuit 1111, the second pixel circuit 1112, the third pixel circuit 1113, and the fourth pixel circuit 1114) included in the first region 1101 or first pixel region 1101 may be arranged to be adjacent to the driving area. The pixel circuit (eg, the fifth pixel circuit 1115 and sixth pixel circuit 1116) included in the second region 1102 or second pixel region 1102 may be arranged to be adjacent to the general area.

In the aspect, when the first region 1101 operates in the first mode and the second region operates in the second mode, the first region 1101 may provide content (or light) to all users around the display apparatus 1100. Meanwhile, the second region 1102 may provide content to a user within a specific distance range from the display apparatus 1100. The range in which the content is provided by the second region 1102 may be narrower than the range in which the content is provided by the first region 1101.

FIG. 12 illustrates an example in which sizes of the first region 1101 and the second region 1102 of FIG. 11 are varied. For the following description of FIG. 12, the same contents as those of FIG. 11 may be omitted.

Referring to FIG. 12, a display apparatus 1200 may be divided into a first region 1201 and a second region 1202. In the aspect, an active region of the display apparatus 1200 may include the first region 1201 and the second region 1202.

The first region 1201 may include a region operating in a first mode, and the second region 1202 may include a region operating in a first mode or a second mode. The area of the first region 1201 of FIG. 12 may be reduced compared to the first region 1101 of FIG. 11. The second region 1202 of FIG. 12 may have an increased area compared to the second region 1102 of FIG. 12. For example, the first region 1201 may include two pixel circuits, and the second region 1202 may include four pixel circuits.

According to the aspect of the present disclosure, a mode controller 1210 may control a mode of each pixel circuit on the basis of connection to each of the pixel circuits arranged in the display apparatus 1200.

According to one aspect of the present disclosure, the mode controller 1201 may control the pixel circuit included in the first region 1201 to operate in the first mode according as the area of the first region 1201 is reduced. The pixel circuit included in the first region 1201 may not operate in the second mode based on the control of the mode controller 1201. For example, the mode controller 1201 may provide the pixel circuit included in the first region 1201 with a signal for operation in the first mode, for example, a first control signal S(1) and S(2) so that a first light emitting element is turned-on. The mode controller 1201 may provide a signal for operation in the second mode, for example, a second control signal P(1) and P(2) so that a second light emitting element is turned-off.

According to one aspect, as the area of the second region 1202 increases, the pixel circuit included in the second region 1202 operates in the first mode or the second mode under the control of the mode controller 1201. The mode controller 1201 may provide the signal for the operation in the first mode or the second mode to the pixel circuit included in the second region 1202, for example, first control signal S(3)~S(6) or second control signal P(3)~P(6).

For example, the input related to the operation in the first mode or the second mode may include a predetermined input provided by a user of the display apparatus 1200. As another example, the input may include an input generated according to the state of the display apparatus 1200. For example, the input may include an input generated in response to a state in which the display apparatus 1200 is moving or a state in which a moving speed of the display apparatus 1200 exceeds a predetermined speed. In this case, information about the state in which the display apparatus 1200 is moving or the state in which the moving speed of the display apparatus 1200 exceeds the predetermined speed may be acquired through another configuration included in the display apparatus 1200, for example, a sensor.

For example, when the state in which the display apparatus 1200 is moving is detected, an input operating in the second mode is generated and provided to the mode controller. For another example, when the state in which the moving speed of the display apparatus 1200 exceeds the predetermined speed is detected, an input operating in the second mode is generated and provided to the mode controller.

FIG. 13 shows an example of a signal provided by the mode controller when the sizes of the first area and the second area are changed from FIG. 11 to FIG. 12.

In the aspect, the mode controller, for example, the mode controller 1110 of FIG. 11 or the mode controller 1210 of FIG. 12 may control the first control signal S(k) (k=1~6) and the second control signal P(k) (k=1~6) by using the gate-off voltage VGH and the gate-on voltage VGL. For example, the mode controller may control the pixel circuit to operate in the first mode or the second mode by controlling each of the first control signal S(k) and the second control signal P(k) to correspond to the gate-off voltage VGH or the gate-on voltage VGL.

In the aspect, on assumption that all transistors included in the pixel circuit are p-type, the mode controller may provide the first control signal S(k)) corresponding to the gate-on voltage VGL to the first control line connected to the pixel circuit included in the first region. The mode controller may provide the second control signal P(k) corresponding to the gate-off voltage VGH to the second control line connected to the pixel circuit included in the first region. In this case, the transistor to which the first control signal is input may be turned-on and the transistor to which the second control signal P(k) is input may be turned-off. The pixel circuit included in the first region may operate the transistor, to which the first control signal S (k) is input, in the first mode according as the first light emitting element connected to the first transistor T1 of FIG. 5 (eg, the first light emitting element ED1 of FIG. 5) emits light.

In the aspect, on assumption that all transistors included in the pixel circuit are p-types, the mode controller 1110 and 1210 may provide the first control signal S(k) corresponding to the gate-off voltage VGH to the first control line connected to the pixel circuit included in the second region. The mode controller 1110 and 1210 may provide the second control signal P(k) corresponding to the gate-on voltage VGL to the second control line connected to the pixel circuit included in the second region. In this case, the transistor to which the first control signal S(k) is input may be turned-off and the transistor to which the second control signal P(k) is input may be turned-on. The pixel circuit included in the second region may operate the transistor, to which the second control signal P(k) is input, in the second mode according as the second light emitting element connected to the second transistor T2 of FIG. 5 (eg, the second light emitting element ED2 of FIG. 5) emits light.

Referring to FIG. 13, the mode controllers 1110 and 1210 may individually control the (1-1)th to (1-6)th control signals S(1) to S(6) and the (2-1)th to (2-6)th control signals P(1) to P(6).

For example, as shown in FIG. 11, when the first to fourth pixel circuits 1111 to 1114 are included in the first region 1101, the mode controller 1110 may control the (1-1)th to (1-4)th control signals S(1) to S (4) to correspond to the gate-on signal VGL. The mode controller 1110 may control the (2-1)th to (2-4)th control signals P(1) to P(4) to correspond to the gate-off voltage VGH.

For example, when the fifth and sixth pixel circuits 1115 and 1116 are included in the second region 1102 and are operated in the second mode, the mode controller 1110 may control the (1-5)th and (1-6)th control signals S(5) and S(6) to correspond to the gate-off voltage VGH. The mode controller 1110 may control the (2-5)th and (2-6)th control signals P(5) and P(6) to correspond to the gate-on voltage VGL.

As another example, when the fifth and sixth pixel circuits 1115 and 1116 are included in the second region 1102 and are operated in the first mode, the mode controller 1110 may control the (1-5)th and (1-6)th control signals S(5) and S(6) to correspond to the gate-on voltage VGL. The mode controller 1110 may control the (2-5)th and (2-6)th control signals P(5) and P(6) to correspond to the gate-off voltage VGH.

In the aspect, the mode controller 1110 and 1210 may receive a region change input. For example, the mode controller 1110 and 1210 may receive the region change input for changing the first region 1101 of FIG. 11 to the first region 1201 of FIG. 12 and changing the second region 1102 of FIG. 11 to the second region 1202 of FIG. 12. When a reception time of the region change input corresponds to a first time point 1310, the mode controller may change the first control signal S(k) and/or the second control signal P(k) of at least some of the first to sixth pixel circuits 1111 to 1116 on the basis of the first time point 1310.

For example, as shown in FIG. 12, the mode controller 1210 may receive a region change input for including the first pixel circuit and the second pixel circuit in the first region 1201 and including the third pixel circuit to the sixth pixel circuit in the second region 1202. The region change input may further include an input for operating the second region in the second mode. In this case, the mode controller 1210 may control the (1-1)th and (1-2)th control signals S(1) and S(2) of the first pixel circuit and the second pixel circuit to correspond to the gate-on voltage VGL. The mode controller 1210 may control the (2-1)th and (2-2)th control signals P(1) and P(2) to correspond to the gate-off voltage VGH. The mode controller may control the (1-3)th to (1-6)th control signals S(3) to S(6) of the third to sixth pixel circuits to correspond to the gate-off voltage VGH. The mode controller 1210 may control the (2-3)th to (2-6)th control signals P(3) to P(6) to correspond to the gate-on voltage VGL.

As shown in FIG. 13, the mode controller according to the aspect of the present disclosure may provide the first control signal (eg, (1-1)th control signal to (1-6)th control signal) and the second control signal (eg, (2-1)th control signal to (2-6)th control signal) to each pixel circuit. The mode controller may provide the first control signal and the second control signal to the pixel circuit through different lines. Accordingly, the display apparatus may vary the first region and the second region by controlling the first control signal and the second control signal for each pixel circuit.

The display apparatus according to the aspect of the present disclosure may provide the signal for controlling the first light emitting element and the second light emitting element through the mode controller. Accordingly, the size of the bezel area in which the gate driving circuit of the display apparatus is disposed may be minimized.

According to the aspect of the present disclosure, the mode controller may be arranged on a printed circuit board. The printed circuit board may be formed of a flexible material. According to one aspect, the printed circuit board may be bent to form the lower bezel and be bent to the rear surface of the display panel. In one aspect, the mode controller may be mounted on the printed circuit board together with another component of the display apparatus, for example, a data driver and/or a timing controller.

Figure 14:
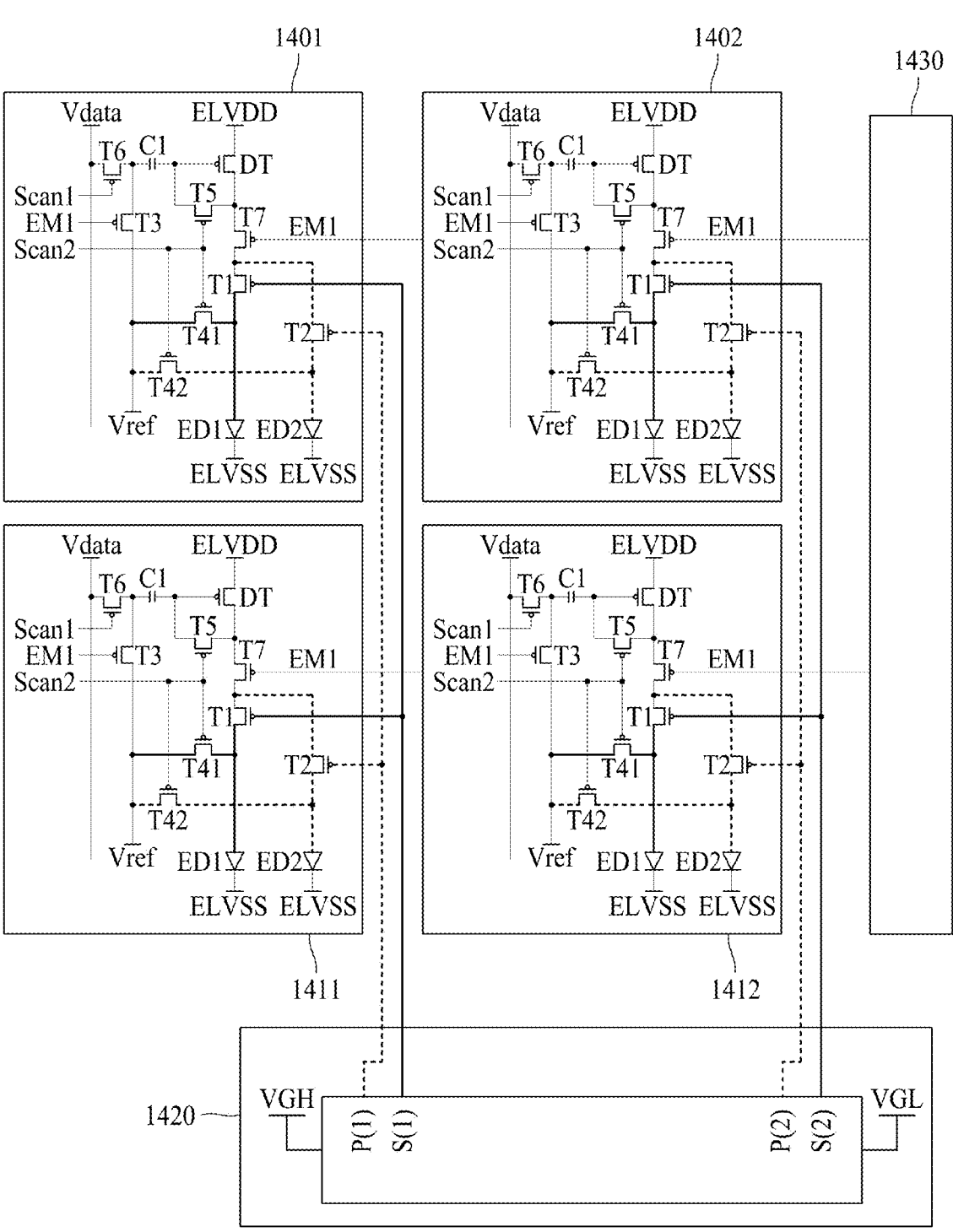
FIG. 14 describes a circuit connection relationship of a display apparatus according to one aspect of the present disclosure.

FIG. 14 describes a circuit connection relationship of a display apparatus according to one aspect of the present disclosure. For convenience of description, FIG. 14 exemplarily illustrates a first pixel circuit 1401 and a second pixel circuit 1402, an eleventh pixel circuit 1411 disposed in the same column as the first pixel circuit 1401, and a twelfth pixel circuit 1412 disposed in the same column as the second pixel circuit 1402. Certain details are omitted for clarity.

Referring to FIG. 14, the first pixel circuit 1401 and the second pixel circuit 1402 may be arranged in an (n)th row.

The eleventh pixel circuit 1411 and the twelfth pixel circuit 1412 may be arranged in an (n+1)th row. The first pixel circuit 1401 and the eleventh pixel circuit 1411 may be arranged in a (k)th column. The second pixel circuit 1402 and the twelfth pixel circuit 1412 may be arranged in a (k+1)th column.

In the aspect, the first pixel circuit 1401, the second pixel circuit 1402, the eleventh pixel circuit 1411, and the twelfth pixel circuit 1412 may be connected to a mode controller 1420 and a gate driving circuit 1430.

According to one aspect, the first pixel circuit 1401 and the second pixel circuit 1402 may be connected to a first stage of the gate driving circuit 1430. For example, a third transistor T3 and a seventh transistor T7 of the first pixel circuit 1401 and the second pixel circuit 1402 may be connected to the first stage of the gate driving circuit 1430. The first stage may be an element for providing a first emission signal EM1 corresponding to the (n)th row. The eleventh pixel circuit 1411 and the twelfth pixel circuit 1412 may be connected to a second stage of the gate driving circuit 1430. For example, a third transistor T3 and a seventh transistor T7 of the eleventh pixel circuit 1411 and the twelfth pixel circuit 1412 may be connected to the second stage of the gate driving circuit 1430. The second stage may be configured to provide a second emission signal EM2 corresponding to the (n+1)th row.

In one aspect, the first pixel circuit 1401 and the second pixel circuit 1402 may be connected in parallel. For example, the first pixel circuit 1401 and the second pixel circuit 1402 may be connected in parallel with respect to a first emission signal line for providing the first emission signal EM1. The third transistor T3 and the seventh transistor T7 of the first pixel circuit 1401 and the second pixel circuit 1402 may be connected in parallel with respect to the first emission signal line. The eleventh pixel circuit 1411 and the twelfth pixel circuit 1412 may be connected in parallel. For example, the eleventh pixel circuit 1411 and the twelfth pixel circuit 1412 may be connected in parallel with respect to a second emission signal line for providing the second emission signal EM2. The third transistor T3 and the seventh transistor T7 of the eleventh pixel circuit 1411 and the twelfth pixel circuit 1412 may be connected in parallel with respect to the second emission signal line.

In one aspect, the first pixel circuit 1401 and the eleventh pixel circuit 1411 may be connected to a first controller of the mode controller 1420. The first controller may include a configuration for providing a (1-1)th control signal S(1) and/or a (2-1)th control signal P(1). The second pixel circuit 1402 and the twelfth pixel circuit 1412 may be connected to a second controller of the mode controller 1420. The second controller may include a configuration for providing a (1-2)th control signal S(2) and a (2-2)th control signal P(2).

The first controller may control the (1-1)th control signal S(1) and/or the (2-2)th control signal P(1) by using the gate-off voltage VGH and the gate-on voltage VGL. The second controller may control the (1-2)th control signal S(2) and/or the (2-2)th control signal P(2) by using the gate-off voltage VGH and the gate-on voltage VGL.

In one aspect, the first pixel circuit 1401 and the eleventh pixel circuit 1411 may be connected in parallel. For example, the first pixel circuit 1401 and the eleventh pixel circuit 1411 may be connected in parallel with respect to the first controller or the (1-1)th control line for providing the (1-1)th control signal S(1). The first transistor T1 of each of the first pixel circuit 1401 and the eleventh pixel circuit 1411 may be connected in parallel to the first controller or the (1-1)th control line for providing the (1-1)th control signal S(1). The first pixel circuit 1401 and the eleventh pixel circuit 1411 may be connected in parallel with respect to the first controller or the (2-1)th control line for providing the (2-1)th control signal P(1). The second transistor T2 of each of the first pixel circuit 1401 and the eleventh pixel circuit 1411 may be connected in parallel with respect to the first controller or the (2-1)th control line for providing the (2-1)th control signal P(1).

In one aspect, the second pixel circuit 1402 and the twelfth pixel circuit 1412 may be connected in parallel. For example, the second pixel circuit 1402 and the twelfth pixel circuit 1412 may be connected in parallel with respect to the second controller or the (1-2)th control line for providing the (1-2)th control signal S(2). The second pixel circuit 1402 and the twelfth pixel circuit 1412 may be connected in parallel with respect to the second controller or the (2-2)th control line for providing the (2-2)th control signal P(2).

The mode controller 1420 according to the aspect of the present disclosure may individually or independently control the pixel circuit on the basis of connection with each of the pixel circuits, for example, the first pixel circuit 1401, the second pixel circuit 1402, the eleventh pixel circuit 1411, and the twelfth pixel circuit 1412, respectively. Accordingly, when the mode controller receives the change information of the first region or the second region, the operation of each pixel circuit may be controlled to correspond to the change information.

In the aspect, the size of the first region and the second region of the display apparatus may be changed in the left and right sides. Through FIGS. 11 to 14, it is confirmed that the pixel circuits arranged in each column may be connected to the same control line. The mode controller may change the size (or range) of the first region and the second region by arranging and connecting the first control line and the second control line every column.

In another aspect, the size of the first region and the second region of the display apparatus may be constant but may be switched with each other. For example, the first region may be changed to the second region, and the second region may be changed to the first region to operate the display apparatus. A more detailed description related thereto may be referred to below with reference to FIGS. 15 to 18.

Figure 15:
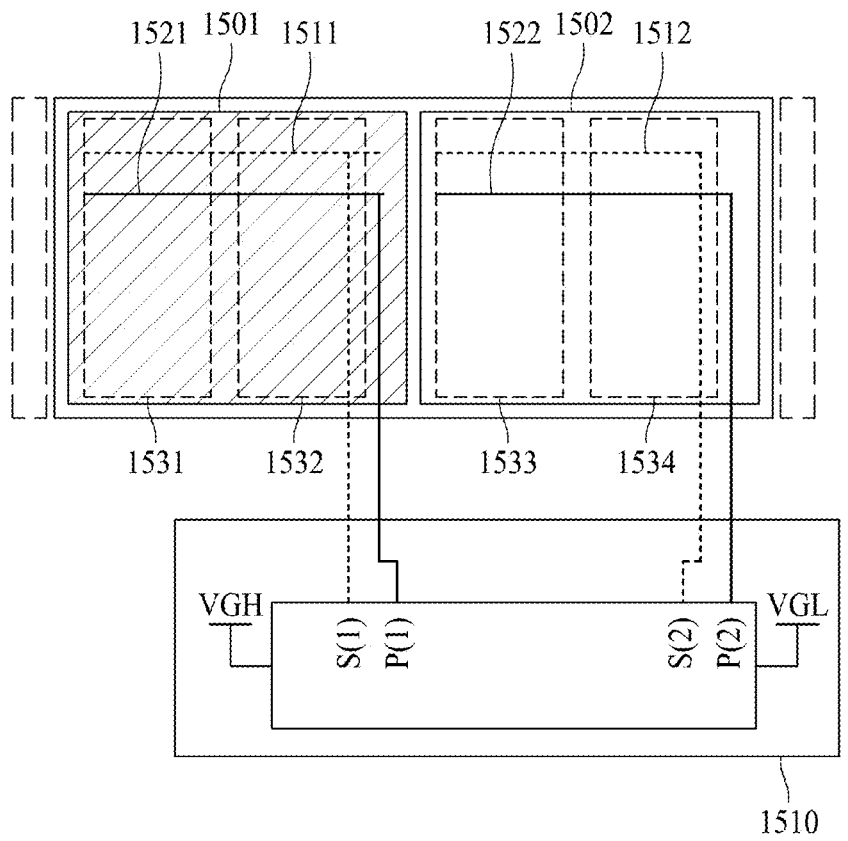
FIGS. 15 to 17 describe a display apparatus according to another aspect of the present disclosure.
Figure 16:
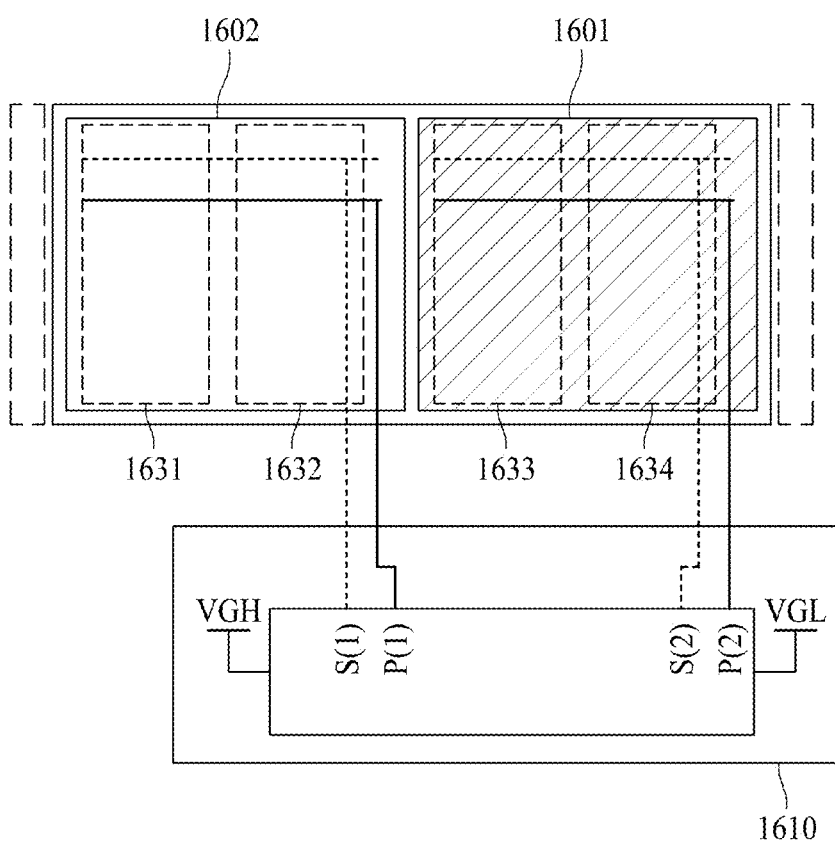
Figure 17:
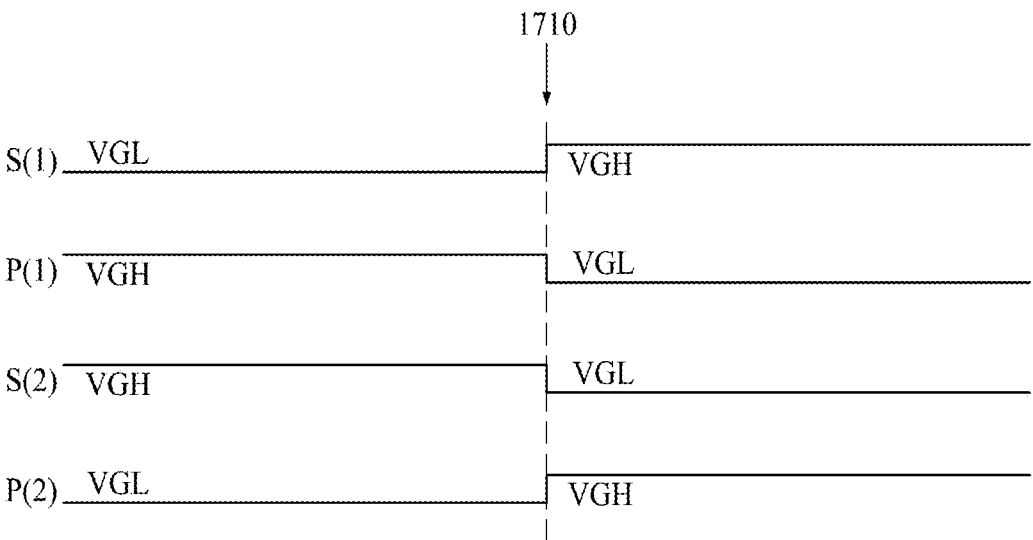

FIGS. 15 to 17 describes a display apparatus according to another aspect of the present disclosure. FIGS. 15 and 16 illustrate examples of changing a first region operating in a first mode and a second region operating in a first mode or a second mode. FIG. 17 illustrates a signal flow corresponding to a region change of FIGS. 15 and 16.

Referring to FIG. 15, a first region 1501 may operate in a first mode and a second region 1502 may operate in a second mode. Each of the first region 1501 and the second region 1502 may include a plurality of pixel circuits.

In the aspect, when the plurality of pixel circuits included in the first region 1501 are a first pixel circuit 1531 and a second pixel circuit 1532, the first pixel circuit 1531 and the second pixel circuit 1532 may be connected to a (1-1)th control line 1511 for providing a (1-1)th control signal S(1). The first pixel circuit 1531 and the second pixel circuit 1532 may be connected to a (2-1)th control line 1521 for controlling a (2-1)th control signal P(1).

In the aspect, when the plurality of pixel circuits included in the second region 1502 are a third pixel circuit 1533 and a fourth pixel circuit 1534, the third pixel circuit 1533 and the fourth pixel circuit 1534 may be connected to a (1-2)th control line 1512 for providing a (1-2) th control signal S(2). The third pixel circuit 1533 and the fourth pixel circuit 1534 may be connected to a (2-2)th control line 1522 for controlling a (2-2)th control signal P(2).

In one aspect, a mode controller 1510 may control the pixel circuits arranged in the first region 1501 by using the (1-1)th control signal S(1) and the (2-1)th control signal P(1). The mode controller 1510 may control the pixel circuits arranged in the second region 1502 by using the (1-2)th control signal S(2) and the (2-2)th control signal P(2).

According to the aspect corresponding to FIG. 15, the operation of the pixel circuits arranged in the first region 1501, for example, the first pixel circuit 1531 and the second pixel circuit 1532 may be controlled together (or identically, or simultaneously, or organically). The operation of the pixel circuits arranged in the second region 1502, for example, the third pixel circuit 1533 and the fourth pixel circuit 1534 may be controlled together. A signal provided by the mode controller 1610 may refer to FIG. 17.

In the case of the aspect of FIG. 15, the sizes of the first region 1501 and the second region 1502 may be fixed. The first region 1501 may include a region operating in the first mode. The first region 1501 may include a region disposed adjacent to a driver's seat, but not limited thereto. The second region 1502 may include a region operating in the first mode and/or the second mode. The second region 1502 may include a region disposed adjacent to a passenger seat, but not limited thereto.

FIG. 16 illustrates an example in which the first region 1501 and the second region 1502 of FIG. 15 are switched with each other. A third pixel circuit 1633 and a fourth pixel circuit 1634 may be included in a first region 1601 of FIG. 16. A first pixel circuit 1631 and a second pixel circuit 1632 may be included in a second region 1602.

In the aspect, a mode controller 1610 may operate the first region 1601 in a first mode. The mode controller 1610 may operate the second region 1602 in the first mode or second mode. A signal provided by the mode controller 1610 may refer to FIG. 17.

FIG. 17 shows an example of a signal provided by a mode controller when positions of a first area and a second area are changed from FIG. 15 to FIG. 16. Hereinafter, the same description as those described above may be omitted.

Referring to FIG. 17, the mode controller, for example, the mode controller 1510 of FIG. 15 or the mode controller 1610 of FIG. 16, may control a first control signal and a second control signal by using a gate-off voltage VGH and a gate-on voltage VGL. Hereinafter, it is assumed that a transistor to which the first control signal (for example, (1-1)th control signal S(1) and (1-2)th control signal S(2)) and the second control signal (for example, (2-1)th control signal P(1) and (2-2)th control signal P(2)) are inputted is p-type, but not limited thereto.

In the aspect, the mode controller 1510 may provide the (1-1)th control signal S(1) corresponding to the gate-on voltage VGL to the first control line connected to the pixel circuit included in the first region 1501 of FIG. 15, for example, the (1-1)th control line 1511 of FIG. 15. The mode controller 1510 may provide the (2-1)th control signal P(1) corresponding to the gate-off voltage VGH to the second control line connected to the pixel circuit included in the first region, for example, the (2-1)th control line 1521 of FIG. 15. In this case, the transistor to which the (1-1)th control signal S(1) is input may be turned-on and the transistor to which the (2-1)th control signal P(1) is input may be turned-off. Accordingly, the first region may operate in the first mode in which a viewing angle is maintained. The first mode may include a mode having a viewing angle of a first value. The second mode described below may include a mode having a second value which is narrower (or smaller) than the first value.

The mode controller 1510 may provide the (1-2)th control signal S(2) corresponding to the gate-off voltage VGH to the first control line connected to the pixel circuit included in the second region 1502 of FIG. 15, for example, the (1-2)th control line 1512 of FIG. 15. The mode controller 1510 may provide the (2-2)th control signal P(2) corresponding to the gate-on voltage VGL to the second control line connected to the pixel circuit included in the second region, for example, the (2-2)th control line 1522 of FIG. 15. In this case, the transistor to which the (1-2)th control signal S(2) is input may be turned-off and the transistor to which the (2-2)th control signal P(2) is input may be turned-on. Accordingly, the second region may operate in the second mode in which a viewing angle is limited.

In one aspect, the mode controller 1510 and 1610 may receive a region change input. For example, the mode controller 1510 and 1610 may receive an input for changing the first region 1501 and the second region 1502 of FIG. 15. When a reception time of the region change input corresponds to a first time point 1710, the mode controller 1510 and 1610 may change the first control signal and/or the second control signal provided to the first region and the second region based on the first time point 1710.

For example, when the mode controller 1510 and 1610 receives the region change input, the mode controller 1510 and 1610 may change the (1-1)th control signal S(1) provided to the first region 1501 of FIG. 15 to correspond to the gate-off voltage VGH, and may change the (2-1)th control signal P(1) to correspond to the gate-on voltage VGL. In addition, the mode controller 1510 and 1610 may change the (1-2)th control signal S(2) provided to the second region 1502 of FIG. 15 to correspond to the gate-on voltage VGL in response to the reception of the region change input, and change the (2-2)th control signal P(2) to correspond to the gate-off voltage VGH.

Figure 18:
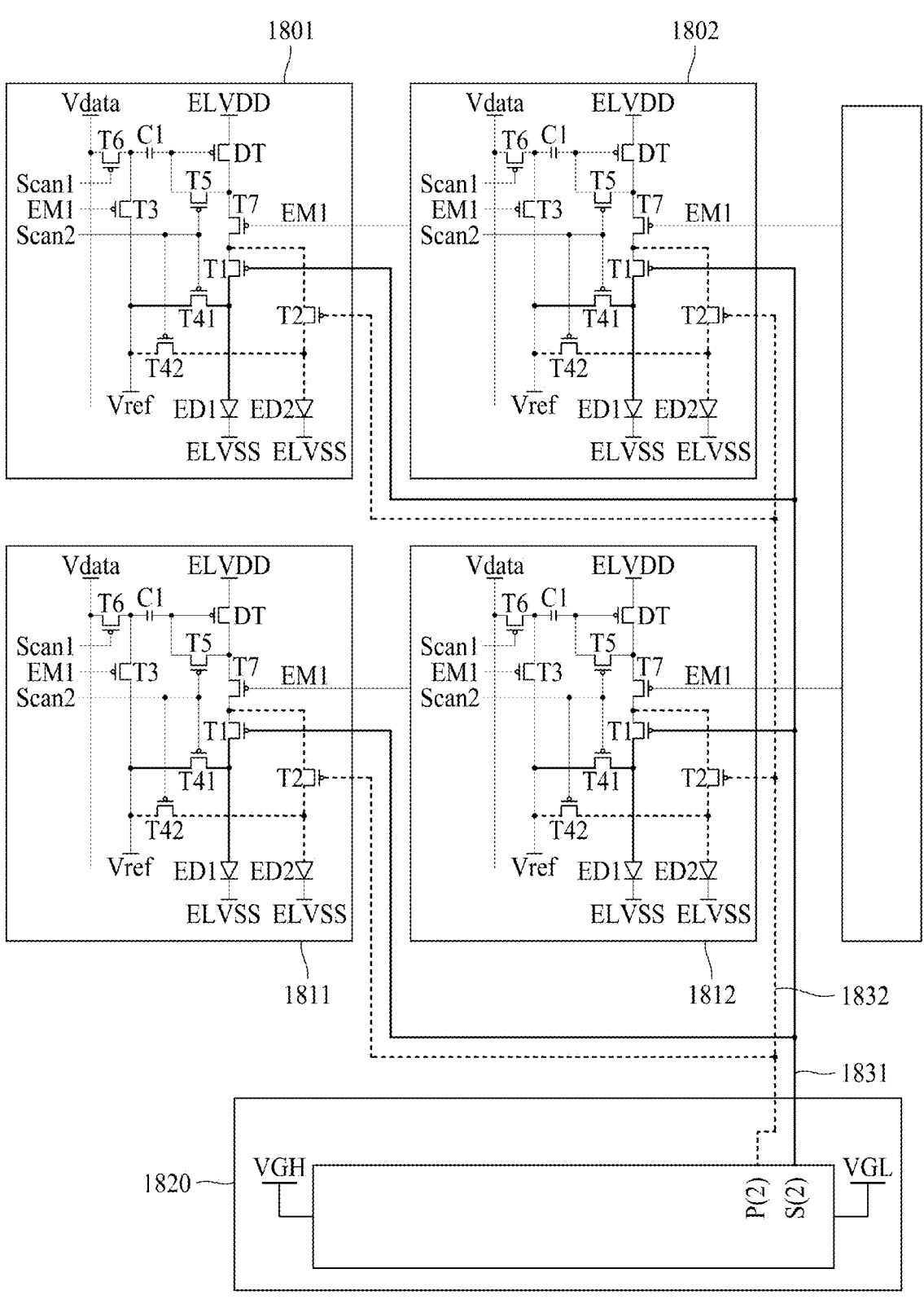
FIG. 18 describes a circuit connection relationship of a display apparatus according to another aspect of the present disclosure.

FIG. 18 describes a circuit connection relationship of a display apparatus according to another aspect of the present disclosure. FIG. 18 exemplarily illustrates the pixel circuit disposed in the second region 1502 of FIG. 15, for convenience of description. In FIG. 18, the same description as those of FIG. 14 may be omitted.

Referring to FIG. 18, pixel circuits disposed in one region may be provided with a first control signal (eg, (1-2)th control signal S(2)) and a second control signal (eg, (2-2)th control signal P(2)).

In one aspect, a mode controller 1820 may provide the first control signal or second control signal to the pixel circuit included in the same region through the same line. For example, a first pixel circuit 1801, a second pixel circuit 1802, a third pixel circuit 1811, and a fourth pixel circuit 1812 may be connected to a (1-2)th control line 1831. A transistor for controlling a first light emitting element ED1 included in each pixel circuit, for example, a first transistor T1 may be connected to the (1-2)th control line 1831. A first pixel circuit 1801, a second pixel circuit 1802, a third pixel circuit 1811, and a fourth pixel circuit 1812 may be connected to a (2-2)th control line 1832. A transistor for controlling a second light emitting element ED2 included in each pixel circuit, for example, a second transistor T2 may be connected to the (2-2)th control line 1832.

As shown in FIG. 18, as the first control line (eg, (1-2)th control line 1831) for providing the first control signal and the second control line (eg, (2-2)th control line 1832) for providing the second control signal are connected to each of the pixel circuits included in the first region or the pixel circuits included in the second region, the mode controller 1820 may control the mode of the pixel circuits included in one region at a time.

The display apparatus and the display panel according to the present disclosure may efficiently control the pixel circuit including the plurality of light emitting elements by using the mode controller. In addition, the display apparatus and the display panel according to the present disclosure may vary the size of common and control regions by controlling the signal provided to the plurality of light emitting elements by using the mode controller.

A display apparatus according to various aspects of the present disclosure may include a mode controller configured to generate a first control signal and a second control signal by using a gate-off voltage and a gate-on voltage, a gate driving circuit configured to generate an emission signal, a first pixel circuit including a driving transistor, a first transistor arranged to receive the first control signal, a second transistor arranged to receive the second control signal, a third transistor arranged to receive the emission signal, a first light emitting element connected to the first transistor, and a second light emitting element connected to the second transistor, a first lens disposed on the first light emitting element, and a second lens disposed on the second light emitting element.

According to various aspects of the present disclosure, the gate driving circuit may arranged to generate the emission signal by using the gate-off voltage and the gate-on voltage. The display apparatus further may include a power supply configured to generate the gate-off voltage and the gate-on voltage.

According to various aspects of the present disclosure, a viewing angle of an area in which the first light emitting element is disposed is determined by the first lens and corresponds to a first value, and a viewing angle of an area in which the second light emitting element is disposed is determined by the second lens and corresponds to a second value smaller than the first value. The first pixel circuit may operate in a first mode in which the viewing angle corresponds to the first value based on the first control signal corresponding to the gate-on voltage and the second control signal corresponding to the gate-off voltage. The first pixel circuit may operate in a second mode in which the viewing angle corresponds to the second value based on the first control signal corresponding to the gate-off voltage and the second control signal corresponding to the gate-on voltage.

According to various aspects of the present disclosure, the display apparatus further may include a second pixel circuit disposed in a same row as the first pixel circuit. The mode controller may provide the first control signal and the second control signal individually to each of the first pixel circuit and the second pixel circuit.

According to various aspects of the present disclosure, the display apparatus may be disposed on at least a portion of a vehicle to provide content to a user. The vehicle may include a driving area in which a user for controlling the vehicle is located, and a passenger area in which a passenger of the user is located. The first pixel circuit may be disposed adjacent to the driving area, and the second pixel circuit is disposed adjacent to the passenger area.

According to various aspects of the present disclosure, the first control signal provided to the first pixel circuit may include a (1-1)th control signal, and the second control signal provided to the first pixel circuit may include a (2-1)th control signal. The first control signal provided to the second pixel circuit may include a (1-2)th control signal, and the second control signal provided to the second pixel circuit may include a (2-2)th control signal. The first pixel circuit may operate in the first mode and the second pixel circuit operates in the second mode based on the (1-1)th control signal corresponding to the gate-on voltage and the (1-2)th control signal corresponding to the gate-off voltage. The first pixel circuit and the second pixel circuit may operate in the first mode based on each of the (1-1)th control signal and the (1-2)th control signal corresponding to the gate-on voltage.

According to various aspects of the present disclosure, the mode controller may control the first control signal and the second control signal based on a user input. Each of the first light emitting element and the second light emitting element may include a light emitting diode.

According to various aspects of the present disclosure, the driving transistor may be connected to both the first transistor and the second transistor.

According to various aspects of the present disclosure, the first lens disposed on the first light emitting area may have a size greater than the first light emitting area, and/or the second lens disposed on the second light emitting area may have a size greater than the second light emitting area.

A display panel according to various aspects of the present disclosure may include a mode controller configured to generate a first control signal and a second control signal in accordance with a gate-off voltage and a gate-on voltage, a gate driving circuit configured to generate an emission signal, a first display region controlled by the mode controller and including at least one first pixel circuit and configured to provide a first viewing angle, a second display region controlled by the mode controller and including at least one second pixel circuit and configured to provide a second viewing angle, the first viewing angle being greater than the second viewing angle, wherein the mode controller provides the first control signal to the first display region and the second control signal to the second display region According to various aspects of the present disclosure, the gate driving circuit may generate the emission signal by using the gate-off voltage and the gate-on voltage. The at least one first pixel circuit of the first region includes a first light emitting element and the at least one first pixel circuit of the first region includes a second light emitting element. The display panel further may include a first lens disposed on the first light emitting element and configured to implement the first viewing angle and a second lens disposed on the second light emitting element and configured to implement the second viewing angle. The at least one first pixel circuit may operate in a first mode based on the first control signal corresponding to the gate-on voltage and the second control signal corresponding to the gate-off voltage. The at least one first pixel circuit may operate in a second mode based on the first control signal corresponding to the gate-off voltage and the second control signal corresponding to the gate-on voltage. The at least one first pixel circuit in the first display region may be disposed in a same row as the at least one second pixel circuit in the second display region. The mode controller may control the first control signal and the second control signal based on a user input.

According to various aspects of the present disclosure, the at least one first pixel circuit may include a driving transistor, a first transistor arranged to receive the first control signal, a second transistor arranged to receive the second control signal, a third transistor arranged to receive the emission signal, the first light emitting element connected to the first transistor, and the second light emitting element connected to the second transistor. The driving transistor may be connected to both the first transistor and the second transistor.

According to various aspects of the present disclosure, the display apparatus may be disposed on at least a portion of a vehicle to provide content to a user. The vehicle may include a driving area in which a user for controlling the vehicle may be located, and a passenger area in which a passenger of the user may be located, and the first pixel circuit may be disposed adjacent to the driving area, and the second pixel circuit may be disposed adjacent to the passenger area.

According to various aspects of the present disclosure, the first control signal provided to the first display region may include a (1-1)th control signal, and the second control signal provided to the first display region includes a (2-1)th control signal, and the first control signal provided to the second display region includes a (1-2)th control signal, and the second control signal provided to the second display region includes a (2-2)th control signal. The first pixel circuit may operate in the first mode and the second pixel circuit may operate in the second mode based on the (1-1)th control signal corresponding to the gate-on voltage and the (1-2)th control signal corresponding to the gate-off voltage. The first pixel circuit and the second pixel circuit may operate in the first mode based on each of the (1-1)th control signal and the (1-2)th control signal corresponding to the gate-on voltage.

According to various aspects of the present disclosure, the mode controller maty control the first control signal and the second control signal based on a user input. Each of the first light emitting element and the second light emitting element may include a light emitting diode. The first lens disposed on the first light emitting area may have a size greater than the first light emitting area, and/or the second lens disposed on the second light emitting area may have a size greater than the second light emitting area.

It will be apparent to those skilled in the art that various modifications and variations can be made in the display panel and the display apparatus of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display apparatus comprising:
   a gate driving circuit configured to generate a gate signal; and
   a display region including a plurality of pixels, each pixel including:
   a first light emitting element;
   a second light emitting element;
   a first transistor connected to the first light emitting element;
   a second transistor connected to the second light emitting element;
   a third transistor configured to be controlled by the gate signal;
   a (4-1)th transistor connected between the first light emitting element and a reference voltage line, and configured to be controlled by a first scan signal from the gate driving circuit;
   a (4-2)th transistor connected between the second light emitting element and the reference voltage line, and configured to be controlled by the first scan signal;
   a driving transistor connected to both the first transistor and the second transistor, and at least one lens disposed on the first light emitting element or second light emitting element,
   wherein the first transistor is configured to be controlled by a first control signal and the second transistor is configured to be controlled by a second control signal.

2. The display apparatus according to claim 1, wherein each pixel further includes:
   a capacitor connected between the third transistor and a gate electrode of the driving transistor, the third transistor connecting the capacitor and the reference voltage line;
   a fifth transistor connected to between the gate electrode and a second electrode of the driving transistor, and configured to be controlled by the first scan signal; and
   a sixth transistor connected between a data line and the capacitor, and configured to be controlled by a second scan signal from the gate driving circuit,
   wherein the reference voltage line is supplied with a reference voltage, and
   wherein a first electrode of the driving transistor is connected to a first power line supplied with a first power voltage, and the second electrode of the driving transistor is connected to both the first transistor and the second transistor.

3. The display apparatus according to claim 2, wherein each pixel further includes:
   a seventh transistor connected between the driving transistor and both the first transistor and the second transistor, and configured to be controlled by an emission signal supplied from the gate driving circuit.

4. The display apparatus according to claim 3, wherein the first scan signal is a (n−1)th scan signal supplied from the gate driving circuit,
   the second scan signal is a (n)th scan signal supplied from the gate driving circuit,
   the emission signal is a (n)th emission signal supplied from the gate driving circuit, and
   the third transistor and the seventh transistor are configured to be controlled by the (n)th emission signal.

5. The display apparatus according to claim 3, wherein a display panel includes the gate driving circuit and the display region, and
   wherein the gate driving circuit includes a scan driver configured to generate the first and second scan signals, and an emission driver configured to generate the emission signal.

6. The display apparatus according to claim 5, wherein the emission driver includes a plurality of stages,
   wherein each stage is configured to generate the emission signal using any one of a start signal and a carry signal, a first clock signal, and a second clock signal.

7. The display apparatus according to claim 1, wherein the display region further includes an encapsulation member disposed on the first light emitting element and the second light emitting element, and
   wherein the at least one lens is disposed on the encapsulation member.

8. The display apparatus according to claim 7, wherein the display region further includes:
   a substrate;
   a buffer film on the substrate;
   a driving portion of the pixel including the first transistor, the second transistor, the third transistor, and a plurality of insulating layers disposed on the buffer film;
   an overcoat layer disposed on the driving portion of the pixel; and
   a lens protection film disposed on the at least one lens, wherein the first light emitting element is disposed on the overcoat layer and is connected to the first transistor through a first contact hole, and wherein the second light emitting element is disposed on the overcoat layer and is connected to the second transistor through a second contact hole.

9. The display apparatus according to claim 7, wherein the encapsulation member includes a first to a third encapsulation layers stacked on the first and second light emitting elements, the first encapsulation layer and the third encapsulation layer include insulating materials, and the second encapsulation layer includes organic insulating materials.

10. The display apparatus according to claim 1, wherein the at least one lens includes:

a first lens disposed on the first light emitting element and configured to provide a first viewing angle in a first direction, and a second lens disposed on the second light emitting element and configured to provide a second viewing angle smaller than the first viewing angle in the first direction.

11. The display apparatus according to claim 10, wherein a first emitting area of the first light emitting element is greater than a second emitting area of the second light emitting element, the first lens has a size greater than the first light emitting area, and the second lens has a size greater than the second light emitting area.

12. The display apparatus according to claim 10, wherein the second light emitting element includes at least two second emitting area separated by a bank insulating film and simultaneously driven by a second lower electrode of the second light emitting element connected to the second transistor, and the second lens includes at least two second lens each disposed on the at least two second emitting area.

13. The display apparatus according to claim 1, further comprising:

a mode controller configured to generate the first control signal and the second control signal.

14. The display apparatus according to claim 13, wherein the plurality pixels include:

a first pixel disposed in a first region; and a second pixel disposed in a second region, the second pixel disposed in a same row as the first pixel, wherein the first control signal provided to the first pixel includes a (1-1)th control signal supplied through a (1-1)th control line from the mode controller, the second control signal provided to the first pixel includes a (2-1)th control signal supplied through a (2-1)th control line from the mode controller, the first control signal provided to the second pixel includes a (1-2)th control signal supplied through a (1-2)th control line from the mode controller, and the second control signal provided to the second pixel includes a (2-2)th control signal supplied through a (2-2)th control line from the mode controller.

15. The display apparatus according to claim 14, wherein, when the (1-1)th control signal is a gate-on voltage and the (2-1)th control signal is a gate-off voltage, the first pixel operates in a first mode, when the (1-1)th control signal is the gate-off voltage and the (2-1)th control signal is a gate-on voltage, the first pixel operates in a second mode, when the (1-2)th control signal is the gate-on voltage and the (2-2)th control signal is the gate-off voltage, the second pixel operates in the first mode, or when the (1-2)th control signal is the gate-off voltage and the (2-2)th control signal is the gate-on voltage, the second pixel operates in the second mode.

16. A display panel comprising:

a first display region controlled by a first control signal and including at least one first pixel and configured to provide a first viewing angle;

a second display region controlled by a second control signal and including at least one second pixel and configured to provide a second viewing angle, the first viewing angle being greater than the second viewing angle; and a gate driving circuit configured to supply gate signals to the first display region and the second display region.

17. The display panel according to claim 16, wherein each of the at least one first pixel and the at least one second pixel includes:

a first light emitting element;

a second light emitting element;

a first lens disposed on the first light emitting element and configured to provide the first viewing angle; and a second lens disposed on the second light emitting element and configured to provide the second viewing angle.

18. The display panel according to claim 17, wherein each of the at least one first pixel and the at least one second pixel further includes:

a first transistor connected to the first light emitting element;

a second transistor connected to the second light emitting element;

a driving transistor connected to both the first transistor and the second transistor;

a third transistor connected to a reference voltage line supplied with a reference voltage;

a capacitor connected between the third transistor and a gate electrode of the driving transistor;

a (4-1)th transistor connected between the first light emitting element and the reference voltage line;

a (4-2)th transistor connected between the second light emitting element and the reference voltage line;

a fifth transistor connected to between the gate electrode and a second electrode of the driving transistor; and a sixth transistor connected between a data line and the capacitor.

19. The display panel according to claim 18, wherein the gate driving circuit includes a scan driver and an emission driver, the (4-1)th transistor, the (4-2)th transistor, and the fifth transistor are controlled by a (n−1)th scan signal supplied from the scan driver, the sixth transistor is configured to be controlled by a (n)th scan signal from the scan driver, and the third transistor is configured to be controlled by a (n)th emission signal from the emission driver.

20. The display panel according to claim 19, wherein each of the at least one first pixel, and wherein the at least one second pixel further includes a seventh transistor connected between the driving transistor and both the first transistor and the second transistor, and configured to be controlled by the (n)th emission signal.

21. The display panel according to claim 19, wherein the first transistor of the at least one first pixel in the first region is controlled by a (1-1)th control signal as the first control signal;

the second transistor of the at least one first pixel in the first region is controlled by a (2-1)th control signal;

the first transistor of the at least one second pixel in the second region is controlled by a (1-2)th control signal; and the second transistor of the at least one second pixel in the second region is controlled by a (2-2)th control signal as the second control signal.

22. The display panel according to claim 21, further comprising a mode controller configured to generate the (1-1)th control signal, the (2-1)th control signal, the (1-2)th control signal, and the (2-2)th control signal.

23. The display panel according to claim 21, wherein, when the first transistor and the first light emitting element of the at least one first pixel are driven, the first region provides the first viewing angle; or when the second transistor and the second light emitting element of the at least one first pixel are driven, the first region provides the second viewing angle, and the first region switches between the first viewing angle and the second viewing angle in response to the (1-1)th control signal and the (2-1)th control signal.

24. The display panel according to claim 21, wherein when the first transistor and the first light emitting element of the at least one second pixel are driven, the second region provides the first viewing angle; or when the second transistor and the second light emitting element of the at least one second pixel are driven, the second region provides the second viewing angle, and the second region switches between the first viewing angle and the second viewing angle in response to the (1-2)th control signal and the (2-2)th control signal.

25. The display panel according to claim 17, wherein the at least one first pixel in the first display region is disposed in a same row as the at least one second pixel in the second display region.

26. The display panel according to claim 16, wherein the display panel is disposed on at least a portion of a vehicle to provide content to a user, the vehicle comprises a driving area in which a user for controlling the vehicle may be located, and a passenger area in which a passenger of the user may be located, and the first display region is disposed adjacent to the driving area, and the second display region is disposed adjacent to the passenger area.

* * * * *